(12) United States Patent
Ackley

(10) Patent No.: US 10,593,130 B2
(45) Date of Patent: *Mar. 17, 2020

(54) EVALUATING IMAGE VALUES

(71) Applicant: Hand Held Products, Inc., Fort Mill, SC (US)

(72) Inventor: H. Sprague Ackley, Seattle, WA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,659

(22) Filed: Oct. 6, 2017

(65) Prior Publication Data

US 2018/0033214 A1 Feb. 1, 2018

Related U.S. Application Data

(63) Continuation of application No. 14/715,916, filed on May 19, 2015, now Pat. No. 9,786,101.

(51) Int. Cl.
*G06T 7/62* (2017.01)
*G07B 17/00* (2006.01)
(Continued)

(52) U.S. Cl.
CPC ........ *G07B 17/00661* (2013.01); *G01B 11/00* (2013.01); *G01B 11/02* (2013.01);
(Continued)

(58) Field of Classification Search
CPC ............... G05D 1/0027; G05D 1/0212; G05D 23/1917; G05D 3/00; G06F 17/30247;
(Continued)

(56) References Cited

U.S. PATENT DOCUMENTS

| | | |
|---|---|---|
| 3,971,065 A | 7/1976 | Bayer |
| 4,026,031 A | 5/1977 | Siddall et al. |
| 4,279,328 A | 7/1981 | Ahlbom |
| 4,398,811 A | 8/1983 | Nishioka et al. |
| 4,495,559 A | 1/1985 | Gelatt et al. |
| 4,634,278 A | 1/1987 | Ross et al. |
| 4,730,190 A | 3/1988 | Win et al. |
| 4,803,639 A * | 2/1989 | Steele .................... G01N 23/18 378/4 |

(Continued)

FOREIGN PATENT DOCUMENTS

| | | |
|---|---|---|
| AU | 2004212587 A1 | 4/2005 |
| CN | 201139117 Y | 10/2008 |

(Continued)

OTHER PUBLICATIONS

United Kingdom Further Examination Report in related GB Patent Application No. 1517842.9 dated Jul. 26, 2018; 5 pages [Cited art has been previously cited in this matter].

(Continued)

*Primary Examiner* — Aklilu K Woldemariam
(74) *Attorney, Agent, or Firm* — Alston & Bird LLP

(57) ABSTRACT

Images of items are evaluated. A first image of the item, having a view of two or more of its surfaces, is captured at a first time. A measurement of at least one dimension of one or more of the surfaces is computed and stored. A second image of the item, having a view of at least one of the two or more surfaces, is captured at a second time, subsequent to the first time. A measurement of the dimension is then computed and compared to the stored first measurement. The computed measurement is evaluated based on the comparison.

20 Claims, 7 Drawing Sheets

EXAMPLE DIMENSIONER AND ITEM VIEW 10

(51) Int. Cl.
*G06K 9/00* (2006.01)
*G01B 11/02* (2006.01)
*G01B 11/00* (2006.01)
*G06K 9/18* (2006.01)
*G06K 9/46* (2006.01)
*G06K 9/52* (2006.01)

(52) U.S. Cl.
CPC .............. *G06K 9/00* (2013.01); *G06K 9/18* (2013.01); *G06K 9/4604* (2013.01); *G06K 9/4652* (2013.01); *G06K 9/52* (2013.01); *G06T 7/62* (2017.01)

(58) Field of Classification Search
CPC ...... G06F 21/32; G06F 3/0481; G06F 3/0482; G06F 3/04845; G06F 3/0425; G06F 21/629; G06F 3/017; G06F 17/30241; G06F 3/016; G06F 17/30725; G06F 3/0485; G06F 3/0236; G06F 3/0237; G06F 9/451; G06F 2203/0381; G06F 3/011; G06F 3/013; G06K 9/00268; G06K 9/00369; G06K 2017/0093; G06K 7/1086; G06K 9/00832; G06K 2009/226; G06K 9/0063; G06K 9/3241; G06K 2209/19; G06K 9/4604; G06K 2017/0051; G06K 7/1456; G06K 9/78; G06Q 30/0639; G06Q 30/0643; G06Q 30/0621; G06Q 10/10; G06Q 20/208; G06Q 30/0601; G08G 1/096725; G08G 1/01; G08G 1/0962; H04N 7/181; H04N 21/44222; H04N 7/163; H04N 21/262; H04N 5/45; H04N 1/00376; B60R 25/00; B60W 2540/00; G09B 5/00; G10L 15/26; G06T 2200/24; G06T 13/80; G06T 7/0075; G06T 1/0007; G06T 2219/2004; G06T 7/0081; G06T 7/0004; G06T 2207/30164; G06T 7/2033; G06T 7/2086; G06T 7/62; H04L 12/282; B60K 2350/1052; B60K 37/02; G01N 21/952; G01N 21/274; G01N 21/88; G01B 11/24; G01B 11/002; G01S 17/89; B07C 7/04; G07B 2017/0004; G07B 2017/00709; G07B 17/00661; A23L 3/363; B65D 2581/3435; H04W 4/80; H04W 4/18; H04W 4/50; H04W 8/22; H04W 4/02; G11B 20/00094; A61B 50/36
USPC ............. 382/101, 141, 195, 254, 173, 154; 235/383, 454, 467, 462, 375
See application file for complete search history.

(56) References Cited

U.S. PATENT DOCUMENTS

| | | |
|---|---|---|
| 4,914,460 A | 4/1990 | Caimi et al. |
| 4,974,919 A | 12/1990 | Muraki et al. |
| 5,111,325 A | 5/1992 | DeJager |
| 5,175,601 A | 12/1992 | Fitts |
| 5,184,733 A | 2/1993 | Arnarson et al. |
| 5,198,648 A | 3/1993 | Hibbard |
| 5,220,536 A | 6/1993 | Stringer et al. |
| 5,243,619 A | 9/1993 | Albers et al. |
| 5,331,118 A | 7/1994 | Jensen |
| 5,359,185 A | 10/1994 | Hanson |
| 5,384,901 A * | 1/1995 | Glassner ............ G06T 11/001 345/591 |
| 5,477,622 A | 12/1995 | Skalnik |
| 5,548,707 A | 8/1996 | LoNegro et al. |
| 5,555,090 A | 9/1996 | Schmutz |
| 5,561,526 A | 10/1996 | Huber et al. |
| 5,590,060 A | 12/1996 | Granville et al. |
| 5,592,333 A | 1/1997 | Lewis |
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Naga et al. |
| 5,748,199 A | 5/1998 | Palm |
| 5,767,962 A | 6/1998 | Suzuki et al. |
| 5,802,092 A | 9/1998 | Endriz |
| 5,808,657 A | 9/1998 | Kurtz et al. |
| 5,831,737 A | 11/1998 | Stringer et al. |
| 5,850,370 A | 12/1998 | Stringer et al. |
| 5,850,490 A * | 12/1998 | Johnson ............... G06F 16/40 382/306 |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim et al. |
| 5,979,760 A | 11/1999 | Freyman et al. |
| 5,988,862 A * | 11/1999 | Kacyra ............... G01B 11/002 382/195 |
| 5,991,041 A | 11/1999 | Woodworth |
| 6,009,189 A | 12/1999 | Schaack |
| 6,025,847 A | 2/2000 | Marks |
| 6,035,067 A | 3/2000 | Ponticos |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,115,114 A | 9/2000 | Berg et al. |
| 6,137,577 A | 10/2000 | Woodworth |
| 6,177,999 B1 | 1/2001 | Wurz et al. |
| 6,189,223 B1 | 2/2001 | Haug |
| 6,232,597 B1 | 5/2001 | Kley |
| 6,236,403 B1 | 5/2001 | Youichiro et al. |
| 6,246,468 B1 | 6/2001 | Dimsdale |
| 6,333,749 B1 | 12/2001 | Reinhardt et al. |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D'Hooge et al. |
| 6,535,776 B1 | 3/2003 | Tobin et al. |
| 6,661,521 B1 | 9/2003 | Stern |
| 6,674,904 B1 | 1/2004 | McQueen |
| 6,705,526 B1 | 3/2004 | Zhu et al. |
| 6,773,142 B2 | 8/2004 | Rekow |
| 6,781,621 B1 | 8/2004 | Gobush et al. |
| 6,804,269 B2 | 10/2004 | Lizotte et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,912,293 B1 | 6/2005 | Korobkin |
| 6,922,632 B2 | 7/2005 | Foxlin |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Zhu et al. |
| 7,137,556 B1 | 11/2006 | Bonner et al. |

(56) References Cited

U.S. PATENT DOCUMENTS

| | | |
|---|---|---|
| 7,159,783 B2 | 1/2007 | Walczyk et al. |
| 7,161,688 B1 | 1/2007 | Bonner et al. |
| 7,205,529 B2 | 4/2007 | Andersen et al. |
| 7,214,954 B2 | 5/2007 | Schopp |
| 7,233,682 B2 | 6/2007 | Levine |
| 7,277,187 B2 | 10/2007 | Smith et al. |
| 7,307,653 B2 | 12/2007 | Dutta |
| 7,310,431 B2 | 12/2007 | Gokturk et al. |
| 7,313,264 B2 | 12/2007 | Crampton |
| 7,353,137 B2 | 4/2008 | Vock et al. |
| 7,413,127 B2 | 8/2008 | Ehrhart et al. |
| 7,509,529 B2 | 3/2009 | Colucci et al. |
| 7,527,205 B2 | 5/2009 | Zhu |
| 7,586,049 B2 | 9/2009 | Wurz |
| 7,602,404 B1 | 10/2009 | Reinhardt et al. |
| 7,614,563 B1 | 11/2009 | Nunnink et al. |
| 7,639,722 B1 | 12/2009 | Paxton et al. |
| 7,726,206 B2 | 6/2010 | Terrafranca, Jr. et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,912,320 B1 | 3/2011 | Minor |
| 7,974,025 B2 | 7/2011 | Topliss |
| 8,009,358 B2 | 8/2011 | Zalevsky et al. |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,061,610 B2 | 11/2011 | Nunnink |
| 8,072,581 B1 | 12/2011 | Breiholz |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Kiao et al. |
| 8,201,737 B1 | 6/2012 | Palacios Durazo et al. |
| 8,212,158 B2 | 7/2012 | Wiest |
| 8,212,889 B2 | 7/2012 | Chanas et al. |
| 8,224,133 B2 | 7/2012 | Popovich et al. |
| 8,228,510 B2 | 7/2012 | Pangrazio et al. |
| 8,230,367 B2 | 7/2012 | Bell et al. |
| 8,294,969 B2 | 10/2012 | Plesko |
| 8,301,027 B2 | 10/2012 | Shaw et al. |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,320,621 B2 | 11/2012 | McEldowney |
| 8,322,622 B2 | 12/2012 | Liu |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,366,005 B2 | 2/2013 | Kotlarsky et al. |
| 8,368,762 B1 | 2/2013 | Chen et al. |
| 8,371,507 B2 | 2/2013 | Haggerty et al. |
| 8,374,498 B2 | 2/2013 | Pastore |
| 8,376,233 B2 | 2/2013 | Van Horn et al. |
| 8,381,976 B2 | 2/2013 | Mohideen |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,594,425 B2 | 11/2013 | Gurman et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |

(56) References Cited

U.S. PATENT DOCUMENTS

| | | |
|---|---|---|
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 * | 7/2014 | Unsworth ............. A61B 90/06 382/128 |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1 | 8/2014 | Hilde |
| 8,820,630 B2 | 9/2014 | Qu et al. |
| 8,822,806 B2 | 9/2014 | Cockerell et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,897,596 B1 * | 11/2014 | Passmore ............. H04N 13/266 382/284 |
| 8,903,172 B2 | 12/2014 | Smith |
| 8,908,277 B2 | 12/2014 | Pesach et al. |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,928,896 B2 | 1/2015 | Kennington et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,993,974 B2 | 3/2015 | Goodwin |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,014,441 B2 | 4/2015 | Truyen et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,066,087 B2 | 6/2015 | Shpunt |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,082,195 B2 | 7/2015 | Holeva et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,142,035 B1 * | 9/2015 | Rotman ................... G06T 7/60 |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,278 B1 | 10/2015 | Kong et al. |
| 9,171,543 B2 | 10/2015 | Emerick et al. |
| 9,183,425 B2 | 11/2015 | Wang |
| 9,189,669 B2 | 11/2015 | Zhu et al. |

(56) References Cited

U.S. PATENT DOCUMENTS

| | | |
|---|---|---|
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,233,470 B1 * | 1/2016 | Bradski .................... B25J 9/163 |
| 9,235,553 B2 | 1/2016 | Fitch et al. |
| 9,235,899 B1 | 1/2016 | Kirmani et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,273,846 B1 | 3/2016 | Rossi et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,299,013 B1 * | 3/2016 | Curlander ................ G06K 9/78 |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,366,861 B1 | 6/2016 | Johnson |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |
| 9,399,557 B1 | 7/2016 | Mishra et al. |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| 9,424,749 B1 | 8/2016 | Reed et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,470,511 B2 | 10/2016 | Maynard et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,486,921 B1 | 11/2016 | Straszheim et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,595,038 B1 * | 3/2017 | Cavalcanti ......... G06Q 30/0185 |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 9,709,387 B2 | 7/2017 | Fujita et al. |
| 9,736,459 B2 | 8/2017 | Mor et al. |
| 9,741,136 B2 | 8/2017 | Holz |
| 9,828,223 B2 | 11/2017 | Svensson et al. |
| 2001/0027995 A1 | 10/2001 | Patel et al. |
| 2001/0032879 A1 | 10/2001 | He et al. |
| 2002/0036765 A1 | 3/2002 | McCaffrey |
| 2002/0054289 A1 | 5/2002 | Thibault et al. |
| 2002/0067855 A1 | 6/2002 | Chiu et al. |
| 2002/0105639 A1 | 8/2002 | Roelke |
| 2002/0109835 A1 * | 8/2002 | Goetz ..................... B07C 5/342 |
| | | 356/237.1 |
| 2002/0113946 A1 | 8/2002 | Kitaguchi et al. |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 * | 12/2002 | Zhu ....................... B82Y 15/00 |
| | | 235/454 |
| 2002/0186897 A1 | 12/2002 | Kim et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0078755 A1 | 4/2003 | Leutz et al. |
| 2003/0091227 A1 | 5/2003 | Chang et al. |
| 2003/0156756 A1 | 8/2003 | Gokturk et al. |
| 2003/0163287 A1 | 8/2003 | Vock et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0132297 A1 | 7/2004 | Baba et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128193 A1 | 6/2005 | Popescu et al. |
| 2005/0128196 A1 | 6/2005 | Popescu et al. |

(56) References Cited

U.S. PATENT DOCUMENTS

| | | |
|---|---|---|
| 2005/0168488 A1 | 8/2005 | Montague |
| 2005/0187887 A1 | 8/2005 | Nicolas et al. |
| 2005/0211782 A1* | 9/2005 | Martin ............... B82Y 15/00 |
| | | 235/462.45 |
| 2005/0240317 A1 | 10/2005 | Kienzle-Lietl |
| 2005/0257748 A1 | 11/2005 | Kriesel et al. |
| 2005/0264867 A1 | 12/2005 | Cho et al. |
| 2006/0036556 A1 | 2/2006 | Knispel |
| 2006/0047704 A1* | 3/2006 | Gopalakrishnan ...... G06F 16/51 |
| 2006/0078226 A1 | 4/2006 | Zhou |
| 2006/0108266 A1 | 5/2006 | Bowers et al. |
| 2006/0109105 A1 | 5/2006 | Varner et al. |
| 2006/0112023 A1 | 5/2006 | Horhann |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0213999 A1 | 9/2006 | Wang et al. |
| 2006/0230640 A1 | 10/2006 | Chen |
| 2006/0232681 A1 | 10/2006 | Okada |
| 2006/0255150 A1 | 11/2006 | Longacre |
| 2006/0269165 A1 | 11/2006 | Viswanathan |
| 2006/0276709 A1 | 12/2006 | Khamene et al. |
| 2006/0291719 A1* | 12/2006 | Ikeda ............... G01B 11/0608 |
| | | 382/154 |
| 2007/0003154 A1* | 1/2007 | Sun .................. G06K 9/00369 |
| | | 382/254 |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1* | 6/2007 | Degnan ................ G06T 11/60 |
| | | 703/1 |
| 2007/0153293 A1 | 7/2007 | Gruhlke et al. |
| 2007/0165013 A1 | 7/2007 | Goulanian et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1* | 2/2008 | Wurz .................. G01B 11/04 |
| | | 177/25.15 |
| 2008/0047760 A1 | 2/2008 | Georgitsis |
| 2008/0050042 A1 | 2/2008 | Zhang et al. |
| 2008/0054062 A1 | 3/2008 | Gunning et al. |
| 2008/0056536 A1 | 3/2008 | Hildreth et al. |
| 2008/0062164 A1 | 3/2008 | Bassi et al. |
| 2008/0065509 A1 | 3/2008 | Williams |
| 2008/0077265 A1 | 3/2008 | Boyden |
| 2008/0079955 A1 | 4/2008 | Storm |
| 2008/0156619 A1 | 7/2008 | Patel et al. |
| 2008/0164074 A1 | 7/2008 | Wurz |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0038182 A1 | 2/2009 | Lans et al. |
| 2009/0046296 A1 | 2/2009 | Kilpartrick et al. |
| 2009/0059004 A1 | 3/2009 | Bochicchio |
| 2009/0081008 A1 | 3/2009 | Somin et al. |
| 2009/0095047 A1* | 4/2009 | Patel ................. G06K 7/10722 |
| | | 73/1.01 |
| 2009/0114818 A1 | 5/2009 | Casares et al. |
| 2009/0134221 A1 | 5/2009 | Zhu et al. |
| 2009/0161090 A1 | 6/2009 | Campbell et al. |
| 2009/0189858 A1 | 7/2009 | Lev et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1* | 3/2010 | Zwart ................ G06F 1/1601 |
| | | 345/173 |
| 2010/0091104 A1 | 4/2010 | Sprigle |
| 2010/0113153 A1 | 5/2010 | Yen et al. |
| 2010/0118200 A1* | 5/2010 | Gelman ................ G06F 3/041 |
| | | 348/578 |
| 2010/0128109 A1 | 5/2010 | Banks |
| 2010/0161170 A1 | 6/2010 | Siris |
| 2010/0171740 A1* | 7/2010 | Andersen ............... G01V 99/00 |
| | | 345/424 |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0194709 A1 | 8/2010 | Tamaki et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1* | 9/2010 | Al-Shameri ......... G06K 9/0063 |
| | | 707/769 |
| 2010/0245850 A1 | 9/2010 | Lee et al. |
| 2010/0254611 A1 | 10/2010 | Arnz |
| 2010/0274728 A1 | 10/2010 | Kugelman |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0040407 A1 | 2/2011 | Lim |
| 2011/0043609 A1 | 2/2011 | Choi et al. |
| 2011/0075936 A1 | 3/2011 | Deaver |
| 2011/0081044 A1 | 4/2011 | Peeper |
| 2011/0099474 A1 | 4/2011 | Grossman et al. |
| 2011/0169999 A1 | 7/2011 | Grunow et al. |
| 2011/0180695 A1 | 7/2011 | Li et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1* | 9/2011 | Berger ................ B07C 3/14 |
| | | 382/101 |
| 2011/0243432 A1 | 10/2011 | Hirsch et al. |
| 2011/0249864 A1 | 10/2011 | Venkatesan et al. |
| 2011/0254840 A1 | 10/2011 | Halstead |
| 2011/0260965 A1 | 10/2011 | Kim et al. |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0297590 A1 | 12/2011 | Ackley et al. |
| 2011/0301994 A1 | 12/2011 | Tieman |
| 2011/0303748 A1 | 12/2011 | Lemma et al. |
| 2011/0310227 A1 | 12/2011 | Konertz et al. |
| 2011/0310256 A1 | 12/2011 | Shishido |
| 2012/0014572 A1 | 1/2012 | Wong et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1* | 3/2012 | Rowe .................. G06K 7/12 |
| | | 235/454 |
| 2012/0074227 A1 | 3/2012 | Ferren et al. |
| 2012/0081714 A1 | 4/2012 | Pangrazio et al. |
| 2012/0082383 A1 | 4/2012 | Kruglick |
| 2012/0111946 A1 | 5/2012 | Golant |
| 2012/0113223 A1 | 5/2012 | Hilliges et al. |
| 2012/0126000 A1 | 5/2012 | Kunzig et al. |
| 2012/0140300 A1 | 6/2012 | Freeman |
| 2012/0168509 A1 | 7/2012 | Nunnink et al. |

(56) References Cited

U.S. PATENT DOCUMENTS

| | | |
|---|---|---|
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1* | 7/2012 | Anderson ............. G01C 15/04 455/456.3 |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 9/2012 | Rodriguez et al. |
| 2012/0223141 A1 | 9/2012 | Good et al. |
| 2012/0224026 A1 | 9/2012 | Bayer et al. |
| 2012/0224060 A1 | 9/2012 | Gurevich et al. |
| 2012/0236212 A1 | 9/2012 | Itoh et al. |
| 2012/0236288 A1 | 9/2012 | Stanley |
| 2012/0242852 A1 | 9/2012 | Hayward et al. |
| 2012/0113250 A1 | 10/2012 | Farlotti et al. |
| 2012/0256901 A1 | 10/2012 | Bendall |
| 2012/0261474 A1 | 10/2012 | Kawashime et al. |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294478 A1 | 11/2012 | Publicover et al. |
| 2012/0294549 A1 | 11/2012 | Doepke |
| 2012/0299961 A1 | 11/2012 | Ramkumar et al. |
| 2012/0300991 A1 | 11/2012 | Mikio |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0314258 A1 | 12/2012 | Moriya |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0075168 A1 | 3/2013 | Amundsen et al. |
| 2013/0076857 A1 | 3/2013 | Kurashige et al. |
| 2013/0093895 A1 | 4/2013 | Palmer et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0201288 A1 | 8/2013 | Billerbaeck et al. |
| 2013/0208164 A1 | 8/2013 | Cazier et al. |
| 2013/0211790 A1 | 8/2013 | Loveland et al. |
| 2013/0222592 A1 | 8/2013 | Gieseke |
| 2013/0223673 A1 | 8/2013 | Davis et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0317642 A1 | 11/2013 | Asaria |
| 2013/0326425 A1 | 12/2013 | Forstall et al. |
| 2013/0329012 A1 | 12/2013 | Bartos |
| 2013/0329013 A1 | 12/2013 | Metois et al. |
| 2013/0332524 A1 | 12/2013 | Fiala et al. |
| 2013/0342343 A1 | 12/2013 | Harring et al. |
| 2013/0342717 A1 | 12/2013 | Havens et al. |
| 2014/0001258 A1 | 1/2014 | Chan et al. |
| 2014/0001267 A1 | 1/2014 | Giordano et al. |
| 2014/0002828 A1 | 1/2014 | Laffargue et al. |
| 2014/0009586 A1 | 1/2014 | McNamer et al. |
| 2014/0019005 A1 | 1/2014 | Lee et al. |
| 2014/0021259 A1 | 1/2014 | Moed et al. |
| 2014/0025584 A1 | 1/2014 | Liu et al. |
| 2014/0031665 A1 | 1/2014 | Pinto et al. |
| 2014/0034731 A1 | 2/2014 | Gao et al. |
| 2014/0034734 A1 | 2/2014 | Sauerwein |
| 2014/0039674 A1 | 2/2014 | Motoyama et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0064624 A1 | 3/2014 | Kim et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0079297 A1 | 3/2014 | Tadayon et al. |
| 2014/0091147 A1 | 4/2014 | Evans et al. |
| 2014/0097238 A1 | 4/2014 | Ghazizadeh |
| 2014/0097252 A1 | 4/2014 | He et al. |
| 2014/0098091 A1 | 4/2014 | Hori |
| 2014/0098243 A1 | 4/2014 | Ghazizadeh |
| 2014/0098244 A1 | 4/2014 | Ghazizadeh |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104664 A1 | 4/2014 | Lee |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125577 A1 | 5/2014 | Hoang et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0131448 A1 | 5/2014 | Kian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Taskahashi |
| 2014/0140585 A1 | 5/2014 | Wang |
| 2014/0142398 A1 | 5/2014 | Patil et al. |
| 2014/0152882 A1 | 6/2014 | Samek et al. |
| 2014/0152975 A1 | 6/2014 | Ko |
| 2014/0157861 A1 | 6/2014 | Jonas et al. |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Yong et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175174 A1 | 6/2014 | Barber et al. |
| 2014/0177931 A1 | 6/2014 | Kocherscheidt et al. |
| 2014/0191913 A1 | 7/2014 | Ge et al. |

(56) References Cited

U.S. PATENT DOCUMENTS

| | | |
|---|---|---|
| 2014/0192187 A1 | 7/2014 | Atwell et al. |
| 2014/0192551 A1 | 7/2014 | Masaki |
| 2014/0197239 A1 | 7/2014 | Havens et al. |
| 2014/0197304 A1 | 7/2014 | Feng et al. |
| 2014/0201126 A1 | 7/2014 | Zadeh et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0240454 A1 | 8/2014 | Lee |
| 2014/0240464 A1 | 8/2014 | Lee |
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1 | 9/2014 | Tohme et al. |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0306833 A1* | 10/2014 | Ricci ............... B60Q 1/00 340/901 |
| 2014/0307855 A1 | 10/2014 | Withagen et al. |
| 2014/0313527 A1 | 10/2014 | Askan |
| 2014/0319219 A1 | 10/2014 | Liu et al. |
| 2014/0320408 A1 | 10/2014 | Zagorsek et al. |
| 2014/0320605 A1 | 10/2014 | Johnson |
| 2014/0333775 A1 | 11/2014 | Naikal et al. |
| 2014/0347533 A1 | 11/2014 | Ovsiannikov et al. |
| 2014/0347553 A1 | 11/2014 | Dvsiannikov et al. |
| 2014/0350710 A1 | 11/2014 | Gopalkrishnan et al. |
| 2014/0351317 A1 | 11/2014 | Smith et al. |
| 2014/0353373 A1 | 12/2014 | Van et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1 | 12/2014 | Nishitani et al. |
| 2015/0001301 A1 | 1/2015 | Ouyang |
| 2015/0003673 A1 | 1/2015 | Fletcher |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0014416 A1 | 1/2015 | Kotlarsky et al. |
| 2015/0016712 A1 | 1/2015 | Rhoads et al. |
| 2015/0021397 A1 | 1/2015 | Rueblinger et al. |
| 2015/0028102 A1 | 1/2015 | Ren et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0036876 A1 | 2/2015 | Marrion et al. |
| 2015/0039309 A1 | 2/2015 | Braho et al. |
| 2015/0040378 A1 | 2/2015 | Saber et al. |
| 2015/0042791 A1 | 2/2015 | Metois et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062160 A1 | 3/2015 | Sakamoto et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1 | 3/2015 | Lloyd et al. |
| 2015/0070158 A1 | 3/2015 | Hayasaka |
| 2015/0070489 A1 | 3/2015 | Hudman et al. |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0116498 A1 | 4/2015 | Vartiainen et al. |
| 2015/0117749 A1 | 4/2015 | Chen et al. |
| 2015/0127791 A1 | 5/2015 | Kosecki et al. |
| 2015/0128116 A1 | 5/2015 | Chen et al. |
| 2015/0130928 A1 | 5/2015 | Maynard et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0163474 A1 | 6/2015 | You |
| 2015/0169925 A1 | 6/2015 | Ch En et al. |
| 2015/0178900 A1 | 6/2015 | Kim et al. |
| 2015/0182844 A1 | 7/2015 | Jang |
| 2015/0186703 A1 | 7/2015 | Chen et al. |
| 2015/0199957 A1 | 7/2015 | Funyak et al. |
| 2015/0204662 A1 | 7/2015 | Kobayashi et al. |
| 2015/0210199 A1 | 7/2015 | Payne |
| 2015/0213590 A1 | 7/2015 | Brown et al. |
| 2015/0213647 A1 | 7/2015 | Laffargue et al. |
| 2015/0219748 A1 | 8/2015 | Hyatt |
| 2015/0220753 A1 | 8/2015 | Zhu et al. |
| 2015/0229838 A1 | 8/2015 | Hakim et al. |
| 2015/0243030 A1 | 8/2015 | Pfeiffer |
| 2015/0248578 A1* | 9/2015 | Utsumi ............... G06K 9/00201 382/154 |
| 2015/0253469 A1 | 9/2015 | Le Gros et al. |
| 2015/0254485 A1 | 9/2015 | Feng et al. |
| 2015/0260830 A1 | 9/2015 | Ghosh et al. |
| 2015/0269403 A1 | 9/2015 | Lei et al. |
| 2015/0201181 A1 | 10/2015 | Herschbach |
| 2015/0276379 A1 | 10/2015 | Ni et al. |
| 2015/0301181 A1 | 10/2015 | Herschbach et al. |
| 2015/0308816 A1 | 10/2015 | Laffargue et al. |
| 2015/0310243 A1 | 10/2015 | Ackley |
| 2015/0310389 A1 | 10/2015 | Crimm et al. |
| 2015/0316368 A1 | 11/2015 | Moench et al. |
| 2015/0325036 A1 | 11/2015 | Lee |
| 2015/0327012 A1 | 11/2015 | Bian et al. |
| 2015/0332075 A1 | 11/2015 | Burch |
| 2015/0332463 A1 | 11/2015 | Galera et al. |
| 2015/0355470 A1 | 12/2015 | Herschbach |
| 2016/0014251 A1 | 1/2016 | Hejl |
| 2016/0169665 A1 | 1/2016 | Deschenes et al. |
| 2016/0040982 A1 | 2/2016 | Li et al. |
| 2016/0042241 A1 | 2/2016 | Todeschini |
| 2016/0048725 A1 | 2/2016 | Holz et al. |
| 2016/0057230 A1 | 2/2016 | Todeschini et al. |
| 2016/0070982 A1 | 2/2016 | Li et al. |
| 2016/0062473 A1 | 3/2016 | Bouchat et al. |
| 2016/0063429 A1 | 3/2016 | Varley et al. |
| 2016/0065912 A1 | 3/2016 | Peterson |
| 2016/0088287 A1 | 3/2016 | Sadi et al. |
| 2016/0090283 A1 | 3/2016 | Svensson et al. |
| 2016/0090284 A1 | 3/2016 | Svensson et al. |
| 2016/0092805 A1 | 3/2016 | Geisler et al. |
| 2016/0094016 A1 | 3/2016 | Beach et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0117631 A1 | 4/2016 | McCloskey et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |

(56) References Cited

U.S. PATENT DOCUMENTS

| | | |
|---|---|---|
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0147408 A1 | 5/2016 | Bevis et al. |
| 2016/0164261 A1 | 6/2016 | Warren |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0178915 A1 | 6/2016 | Mor et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0187186 A1 | 6/2016 | Coleman et al. |
| 2016/0187187 A1 | 6/2016 | Coleman et al. |
| 2016/0187210 A1 | 6/2016 | Coleman et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0191801 A1 | 6/2016 | Sivan |
| 2016/0192051 A1 | 6/2016 | DiPiazza et al. |
| 2016/0125873 A1 | 7/2016 | Braho et al. |
| 2016/0202478 A1 | 7/2016 | Masson et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203641 A1 | 7/2016 | Bostick et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0210780 A1 | 7/2016 | Paulovich et al. |
| 2016/0316190 A1 | 7/2016 | McCloskey et al. |
| 2016/0223474 A1 | 8/2016 | Tang et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0328854 A1 | 11/2016 | Kimura |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0103545 A1 | 4/2017 | Holz |
| 2017/0108838 A1 | 4/2017 | Todeschini et al. |
| 2017/0108895 A1 | 4/2017 | Chamberlin et al. |
| 2017/0115490 A1 | 4/2017 | Hsieh et al. |
| 2017/0115497 A1 | 4/2017 | Chen et al. |
| 2017/0116462 A1 | 4/2017 | Ogasawara |
| 2017/0118355 A1 | 4/2017 | Wong et al. |
| 2017/0121158 A1 | 5/2017 | Wong |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0132806 A1 | 5/2017 | Balachandreswaran |
| 2017/0139012 A1 | 5/2017 | Smith |
| 2017/0139213 A1 | 5/2017 | Schmidtlin |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0148250 A1 | 5/2017 | Angermayer |
| 2017/0150124 A1 | 5/2017 | Thuries |
| 2017/0018294 A1 | 6/2017 | Hardy et al. |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0182942 A1 | 6/2017 | Hardy et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |
| 2017/0200296 A1 | 7/2017 | Jones et al. |
| 2017/0309108 A1 | 10/2017 | Sadovsky et al. |

(56) References Cited

U.S. PATENT DOCUMENTS

| | | |
|---|---|---|
| 2017/0336870 A1 | 11/2017 | Everett et al. |
| 2018/0018627 A1 | 1/2018 | Ross |

FOREIGN PATENT DOCUMENTS

| | | |
|---|---|---|
| DE | 3335760 A1 | 4/1985 |
| DE | 10210813 A1 | 10/2003 |
| DE | 102007037282 A1 | 3/2008 |
| EP | 1111435 A2 | 6/2001 |
| EP | 1443312 A1 | 8/2004 |
| EP | 1112483 B1 | 5/2006 |
| EP | 1232480 B1 | 5/2006 |
| EP | 2013117 A1 | 1/2009 |
| EP | 2216634 A1 | 8/2010 |
| EP | 2286932 A2 | 2/2011 |
| EP | 2372648 A2 | 10/2011 |
| EP | 2381421 A2 | 10/2011 |
| EP | 2533009 A1 | 12/2012 |
| EP | 2562715 A1 | 2/2013 |
| EP | 2722656 A1 | 4/2014 |
| EP | 2779027 A1 | 9/2014 |
| EP | 2833323 A2 | 2/2015 |
| EP | 2843590 A2 | 3/2015 |
| EP | 2845170 A1 | 3/2015 |
| EP | 2966595 A1 | 1/2016 |
| EP | 3006893 A1 | 3/2016 |
| EP | 3012601 A1 | 3/2016 |
| EP | 3007096 A1 | 4/2016 |
| EP | 3270342 A1 | 1/2018 |
| GB | 2503978 A1 | 1/2014 |
| GB | 2525053 A | 10/2015 |
| GB | 2531928 A | 5/2016 |
| JP | H04129902 A | 4/1992 |
| JP | 200696457 A | 4/2006 |
| JP | 2007084162 A | 4/2007 |
| JP | 2008210276 A | 9/2008 |
| JP | 2014210646 A | 11/2014 |
| JP | 2015174705 A | 10/2015 |
| KR | 20100020115 A | 2/2010 |
| KR | 20110013200 A | 2/2011 |
| KR | 20110117020 A | 10/2011 |
| KR | 20120028109 A | 3/2012 |
| WO | 96/40452 A1 | 12/1996 |
| WO | 0077726 A1 | 12/2000 |
| WO | 0114836 A1 | 3/2001 |
| WO | 2006095110 A1 | 9/2006 |
| WO | 2007015059 A1 | 2/2007 |
| WO | 200712554 A1 | 11/2007 |
| WO | 2011017241 A1 | 2/2011 |
| WO | 2012175731 A1 | 12/2012 |
| WO | 2013021157 A1 | 2/2013 |
| WO | 2013033442 A1 | 3/2013 |
| WO | 2013/173985 A1 | 11/2013 |
| WO | 2013163789 A1 | 11/2013 |
| WO | 2013166368 A1 | 11/2013 |
| WO | 20130184340 A1 | 12/2013 |
| WO | 2014/019130 A1 | 2/2014 |
| WO | 2014023697 A1 | 2/2014 |
| WO | 2014/110495 A1 | 7/2014 |
| WO | 2014102341 A1 | 7/2014 |
| WO | 2014149702 A1 | 9/2014 |
| WO | 2014151746 A1 | 9/2014 |
| WO | 2015006865 A1 | 1/2015 |
| WO | 2016020038 A1 | 2/2016 |
| WO | 2016061699 | 4/2016 |
| WO | 2016061699 A1 | 4/2016 |
| WO | 2016085682 A1 | 6/2016 |

OTHER PUBLICATIONS

United Kingdom Further Examination Report in related GB Patent Application No. 1517112.7 dated Jul. 17, 2018; 4 pages [No art cited].

United Kingdom Further Examination Report in related GB Patent Application No. 1620676.5 dated Jul. 17, 2018; 4 pages [No art cited].

Office Action in counterpart European Application No. 13186043.9 dated Sep. 30, 2015, pp. 1-7.

Lloyd et al., "System for Monitoring the Condition of Packages Throughout Transit", U.S. Appl. No. 14/865,57, filed Sep. 25, 2015, 59 pages, not yet published.

McCloskey et al., "Image Transformation for Indicia Reading," U.S. Appl. No. 14/928,032, filed Oct. 30, 2015, 48 pages, not yet published.

Great Britain Combined Search and Examination Report in related Application GB1517842.9, dated Apr. 8, 2016, 8 pages.

Search Report in counterpart European Application No. 15182675.7, dated Dec. 4, 2015, 10 pages.

Wikipedia, "3D projection" Downloaded on Nov. 25, 2015 from www.wikipedia.com, 4 pages.

M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.

European Extended Search Report in Related EP Application No. 16172995.9, dated Aug. 22, 2016, 11 pages.

European Extended search report in related EP Application No. 15190306.9, dated Sep. 9, 2016, 15 pages.

Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.

European extended Search report in related EP Application 13785171.3, dated Sep. 19, 2016, 8 pages.

El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.

El-Hakim et al., "A Knowledge-based Edge/Object Measurement Technique", Retrieved from the Internet: URL: https://www.researchgate.net/profile/Sabry_E1 -Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.

H. Sprague Ackley, "Automatic Mode Switching in a Volume Dimensioner", U.S. Appl. No. 15/182,636, filed Jun. 15, 2016, 53 pages, Not yet published.

Bosch Tool Corporation, "Operating/Safety Instruction for DLR 130", Dated Feb. 2, 2009, 36 pages.

European Search Report for related EP Application No. 16152477.2, dated May 24, 2016, 8 pages.

Mike Stensvold, "get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].

Houle et al., "Vehical Positioning and Object Avoidance", U.S. Appl. No. 15/007,522 [not yet published], filed Jan. 27, 2016, 59 pages.

United Kingdom combined Search and Examination Report in related GB Application No. 1607394.2, dated Oct. 19, 2016, 7 pages.

European Search Report from related EP Application No. 16168216.6, dated Oct. 20, 2016, 8 pages.

Ulusoy, Ali Osman et al.; "One-Shot Scanning using De Bruijn Spaced Grids", Brown University; 2009 IEEE 12th International Conference on Computer Vision Workshops, ICCV Workshops, pp. 1786-1792 [Cited in EPO Search Report dated Dec. 5, 2017}.

Extended European Search report in related EP Application No. 17189496.7 dated Dec. 5, 2017; 9 pages.

Extended European Search report in related EP Application No. 17190323.0 dated Jan. 19, 2018; 6 pages [Only new art cited herein].

Examination Report in related GB Application No. GB1517843.7, dated Jan. 19, 2018, 4 pages [Only new art cited herein].

(56) References Cited

OTHER PUBLICATIONS

Examination Report in related EP Application No. 15190315, dated Jan. 26, 2018, 6 pages [Only new art cited herein].
Peter Clarke, Actuator Developer Claims Anti-Shake Breakthrough for Smartphone Cams, Electronic Engineering Times, p. 24, May 16, 2011. [Previously cited and copy provided in parent application].
Spiller, Jonathan; Object Localization Using Deformable Templates, Master's Dissertation, University of the Witwatersrand, Johannesburg, South Africa, 2007; 74 pages [Previously cited and copy provided in parent application].
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages. [Previously cited and copy provided in parent application].
European Search Report for application No. EP13186043 dated Feb. 26, 2014 (now EP2722656 (dated Apr. 23, 2014)): Total pp. 7 [Previously cited and copy provided in parent application].
International Search Report for PCT/US2013/039438 (WO2013166368), dated Oct. 1, 2013, 7 pages [Previously cited and copy provided in parent application].
Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant [Previously cited and copy provided in parent application].
European Office Action for application EP 13186043, dated Jun. 12, 2014(now EP2722656 (dated Apr. 23, 2014)), Total of 6 pages [Previously cited and copy provided in parent application].
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages. [Previously cited and copy provided in parent application].
U.S. Appl. No. 14/801,023, Tyler Doornenbal et al., filed Jul. 16, 2015, not published yet, Adjusting Dimensioning Results Using Augmented Reality, 39 pages [Previously cited and copy provided in parent application].
Wikipedia, YUV description and definition, downloaded from http://www.wikipeida.org/wiki/YUV on Jun. 29, 2012, 10 pages [Previously cited and copy provided in parent application].
YUV Pixel Format, downloaded from http://www.fource.org/yuv.php on Jun. 29, 2012; 13 pages. [Previously cited and copy provided in parent application].
YUV to RGB Conversion, downloaded from http://www.fource.org/fccyvrgb.php on Jun. 29, 2012; 5 pages [Previously cited and copy provided in parent application].
Benos et al., "Semi-Automatic Dimensioning with Imager of a Portable Device," U.S. Appl. No. 61/149,912, filed Feb. 4, 2009 (now expired), 56 pages. [Previously cited and copy provided in parent application].
Dimensional Weight—Wikipedia, the Free Encyclopedia, URL= http://en.wikipedia.org/wiki/Dimensional_weight, download date Aug. 1, 2008, 2 pages. [Previously cited and copy provided in parent application].
Dimensioning—Wikipedia, the Free Encyclopedia, URL=http://en.wikipedia.org/wiki/Dimensioning, download date Aug. 1, 2008, 1 page [Previously cited and copy provided in parent application].
European Patent Office Action for Application No. 14157971.4-1906, dated Jul. 16, 2014, 5 pages. [Previously cited and copy provided in parent application].
European Patent Search Report for Application No. 14157971.4-1906, dated Jun. 30, 2014, 6 pages. [Previously cited and copy provided in parent application].
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages [Previously cited and copy provided in parent application].
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008) , 6 pages [Previously cited and copy provided in parent application].
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages [Previously cited and copy provided in parent application].
Proesmans, Marc et al. "Active Acquisition of 3D Shape for Moving Objects" 0-7803-3258-X/96 1996 IEEE; 4 pages [Previously cited and copy provided in parent application].
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages [Previously cited and copy provided in parent application].
EP Search and Written Opinion Report in related matter EP Application No. 14181437.6, dated Mar. 26, 2015, 7 pages. [Previously cited and copy provided in parent application].
Hetzel, Gunter et al.; "3D Object Recognition from Range Images using Local Feature Histograms,", Proceedings 2OO1 IEEE Conference on Computer Vision and Pattern Recognition. CVPR 2001. Kauai, Hawaii, Dec. 8-14, 2001; pp. 394-399, XP010584149, ISBN: 978-0-7695-1272-3. [Previously cited and copy provided in parent application].
Second Chinese Office Action in related CN Application No. 201520810685.6, dated Mar. 22, 2016, 5 pages, no references. [Previously cited and copy provided in parent application].
European Search Report in related EP Application No. 15190315.0, dated Apr. 1, 2016, 7 pages [Previously cited and aopy provided in parent application].
Second Chinese Office Action in related CN Application No. 2015220810562.2, dated Mar. 22, 2016, 5 pages. English Translation provided [No references] [Previously cited and copy provided in parent application].
European Search Report for related Application EP 15190249.1, dated Mar. 22, 2016, 7 pages. [Previously cited and copy provided in parent application].
Second Chinese Office Action in related CN Application No. 201520810313.3, dated Mar. 22, 2016, 5 pages. English Translation provided [No references].
U.S. Appl. No. 14/800,757 , Eric Todeschini, filed Jul. 16, 2015, not published yet, Dimensioning and Imaging Items, 80 pages [Previously cited and copy provided in parent application].
U.S. Appl. No. 14/747,197, Serge Thuries et al., filed Jun. 23, 2015, not published yet, Optical Pattern Projector; 33 pages [Previously cited and copy provided in parent application].
U.S. Appl. No. 14/747,490, Brian L. Jovanovski et al., filed Jun. 23, 2015, not published yet, Dual-Projector Three-Dimensional Scanner; 40 pages [Previously cited and copy provided in parent application].
Search Report and Opinion in related GB Application No. 1517112.7, dated Feb. 19, 2016, 6 Pages [Previously cited and copy provided in parent application].
U.S. Appl. No. 14/793,149, H. Sprague Ackley, filed Jul. 7, 2015, not published yet, Mobile Dimensioner Apparatus for Use in Commerce; 57 pages [Previously cited and copy provided in parent application].
U.S. Appl. No. 14/740,373, H. Sprague Ackley et al., filed Jun. 16, 2015, not published yet, Calibrating a Volume Dimensioner; 63 pages [Previously cited and copy provided in parent application].
Intention to Grant in counterpart European Application No. 14157971.4 dated Apr. 14, 2015, pp. 1-8 [Previously cited and copy provided in parent application].
Decision to Grant in counterpart European Application No. 14157971.4 dated Aug. 6, 2015, pp. 1-2 [Previously cited and copy provided in parent application].
Leotta, Matthew, Generic, Deformable Models for 3-D Vehicle Surveillance, May 2010, Doctoral Dissertation, Brown University, Providence RI, 248 pages [Previously cited and copy provided in parent application].

(56) References Cited

OTHER PUBLICATIONS

Ward, Benjamin, Interactive 3D Reconstruction from Video, Aug. 2012, Doctoral Thesis, Univesity of Adelaide, Adelaide, South Australia, 157 pages [Previously cited and copy provided in parent application].
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages [Previously cited and copy provided in parent application].
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages [Previously cited and copy provided in parent application].
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG "10, 8 pages [Previously cited and copy provided in parent application].
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages. [Previously cited and copy provided in parent application].
European Search Report for Related EP Application No. 15189214. 8, dated Mar. 3, 2016, 9 pages [Previously cited and copy provided in parent application].
Santolaria et al. "A one-step intrinsic and extrinsic calibration method for laster line scanner operation in coordinate measuring machines", dated Apr. 1, 2009, Measurement Science and Technology, IOP, Bristol, GB, vol. 20, No. 4; 12 pages [Previously cited and copy provided in parent application].
Search Report and Opinion in Related EP Application 15176943.7, dated Jan. 8, 2016, 8 pages [Previously cited and copy provided in parent application].
European Search Report for related EP Application No. 15188440. 0, dated Mar. 8, 2016, 8 pages. [Previously cited and copy provided in parent application].
United Kingdom Search Report in related application GB1517842. 9, dated Apr. 8, 2016, 8 pages [Previously cited and copy provided in parent application].
Great Britain Search Report for related Application on. GB1517843. 7, dated Feb. 23, 2016; 8 pages [Previously cited and copy provided in parent application].
European Extended Search Report in related EP Application No. 17201794.9, dated Mar. 16, 2018, 10 pages [Only new art cited herein].
European Extended Search Report in related EP Application 17205030. 4, dated Mar. 22, 2018, 8 pages.
European Exam Report in related EP Application 16172995.9, dated Mar. 15, 2018, 7 pages (Only new art cited herein).
United Kingdom Combined Search and Examination Report dated Mar. 21, 2018, 5 pages (Art has been previously cited).
European extended Search Report in related Application No. 17207882.6 dated Apr. 26, 2018, 10 pages.
Combined Search and Examination Report in related UK Application No. GB1900752.5 dated Feb. 1, 2019, pp. 1-5.
Examination Report in related UK Application No. GB1517842.9 dated Mar. 8, 2019, pp. 1-4.
Examination Report in related EP Application No. 13193181.8 dated Mar. 20, 2019, pp. 1-4.
First Office Action in related CN Application No. 201510860188.1 dated Jan. 18, 2019, pp. 1-14 [All references previously cited.].
Examination Report in related EP Application No. 13785171.3 dated Apr. 2, 2019, pp. 1-5.
Lowe David G., "Filling Parameterized Three-Dimensional Models to Images", IEEE Transaction on Pattern Analysis and Machine Intelligence, IEEE Computer Society, USA, vol. 13, No. 5, May 1, 1991, pp. 441-450.

Padzensky, Ron; "Augmera; Gesture Control", Dated Apr. 18, 2015, 15 pages [Examiner Cited Art in Office Action dated Jan. 20, 2017 in related Application.]
Grabowski, Ralph; "New Commands in AutoCADS 2010: Part 11 Smoothing 3D Mesh Objects" Dated 2011, 6 pages, [Examiner Cited Art in Office Action dated Jan. 20, 2017 in related Application.]
Theodoropoulos, Gabriel; "Using Gesture Recognizers to Handle Pinch, Rotate, Pan, Swipe, and Tap Gestures" dated Aug. 25, 2014, 34 pages, [Examiner Cited Art in Office Action dated Jan. 20, 2017 in related Application.]
Boavida et al., "Dam monitoring using combined terrestrial imaging systems", 2009 Civil Engineering Survey De/Jan. 2009, pp. 33-38 {Cited in Notice of Allowance dated Sep. 15, 2017 in related matter}.
Ralph Grabowski, "Smothing 3D Mesh Objects," New Commands in AutoCAD 2010: Part 11, Examiner Cited art in related matter Non Final Office Action dated May 19, 2017; 6 pages.
Wikipedia, "Microlens", Downloaded from https://en.wikipedia.org/wiki/Microlens, pp. 3. {Feb. 9, 2017 Final Office Action in related matter}.
Fukaya et al., "Characteristics of Speckle Random Pattern and Its Applications", pp. 317-327, Nouv. Rev. Optique, t.6, n.6. (1975) {Feb. 9, 2017 Final Office Action in related matter: downloaded Mar. 2, 2017 fro http://iopscience.iop.org}.
Thorlabs, NPL in Advisory Action dated Apr. 12, 2017 in related commonly owned application, downloaded from https://www.thorlabs.com/newgrouppage9.cfm?objectgroup_id=6430, 4 pages.
EKSMA Optics, NPL in Advisory Action dated Apr. 12, 2017 in related commonly owned application, downloaded from http://eksmaoptics.com/optical-systems/f-theta-lenses/f-theta-lens-for-1064-nm/, 2 pages.
Sill Optics, NPL in Advisory Action dated Apr. 12, 2017 in related commonly owned application, http://www.silloptics.de/1/products/sill-encyclopedia/laser-optics/f-theta-lenses/, 4 pages.
United Kingdom Further Exam Report in related application GB1607394.2 dated Oct. 5, 2018; 5 pages {Only new art cited here in].
European Extended Search Report in related EP application 18184864. 9, dated Oct. 30, 2018, 7 pages.
European Extended Search Report in related EP Application No. 16190017.0, dated Jan. 4, 2017, 6 pages.
European Extended Search Report in related EP Application No. 16173429.8, dated Dec. 1, 2016, 8 pages [US 2013/0038881 cited on separate IDS filed concurrently herewith].
Extended European Search Report in related EP Application No. 16175410.0, dated Dec. 13, 2016, 5 pages.
European extended search report in related EP Application 16190833. 0, dated Mar. 9, 2017, 8 pages [US Publication 2014/0034731 cited on separate IDS filed concurrently herewith].
United Kingdom Combined Search and Examination Report in related Application No. GB1620676.5, dated Mar. 8, 2017, 6 pages [References cited on separate IDS filed concurrently herewith; WO2014/151746, WO2012/175731, US2014/0313527, GB2503978].
European Exam Report in related , EP Application No. 16168216.6, dated Feb. 27, 2017, 5 pages, [cited on separate IDS filed concurrently herewith; WO2011/017241 and US 2014/0104413].
EP Search Report in related EP Application No. 17171844 dated Sep. 18, 2017. 4 pages [Only new art cited herein; some art has been cited on separate IDS filed concurrently herewith}.
EP Extended Search Report in related EP Applicaton No. 17174843.7 dated Oct. 17, 2017, 5 pages {Only new art cited herein; some art has been cited on separate IDS filed concurrently herewith}.
UK Further Exam Report in related UK Application No. GB1517842. 9, dated Sep. 1, 2017, 5 pages (only new art cited herein; some art cited on separate IDS filed concurrently herewith).
European Exam Report in related EP Application No. 15176943.7, dated Apr. 12, 2017, 6 pages [Art cited on separate IDS filed concurrently herewith].
European Exam Report in related EP Application No. 15188440.0, dated Apr. 21, 2017, 4 pages [Art has been cited on separate IDS filed concurrently herewith.].

(56) References Cited

OTHER PUBLICATIONS

European Examination report in related EP Application No. 14181437.6, dated Feb. 8, 2017, 5 pages [References cited on separate IDS filed concurrently herewith].
Chinese Notice of Reexamination in related Chinese Application 201520810313.3, dated Mar. 14, 2017, English Computer Translation provided, 7 pages [References cited on separate IDS filed concurrently herewith].
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017; NPL 14].
European Exam Report in related EP Application No. 16152477.2, dated Jun. 20, 2017, 4 pages [References cited on separate IDS filed concurrently herewith].
European Exam Report in related EP Applciation 16172995.9, dated Jul. 6, 2017, 9 pages [References cited on separate IDS filed concurrently herewith].
United Kingdom Search Report in related Application No. GB1700338.5, dated Jun. 30, 2017, 5 pages.
European Search Report in related EP Application No. 17175357.7, dated Aug. 17, 2017, pp. 1-7 [References cited on separate IDS filed concurrently herewith].
Combined Search and Examination Report in related UK Application No. GB1817189.2 dated Nov. 14, 2018, pp. 1-4 [Reference previously cited.].
Examination Report in related UK Application No. GB1517842.9 dated Dec. 21, 2018, pp. 1-7 [All references previously cited.].
Examination Report in European Application No. 16152477.2 dated Jun. 18, 2019, pp. 1-6.
Examination Report in European Application No. 17175357.7 dated Jun. 26, 2019, pp. 1-5 [All references previously cited.].
Examination Report in European Application No. 19171976.4 dated Jun. 19 2019, pp. 1-8.
Examination Report in GB Application No. 1607394.2 dated Jul. 5 2019, pp. 1-4.
European Search Report for Related EP Application No. 15189214.8, dated Mar. 3, 2016, 9 pages.
European Search Report in related EP Application No. 15190315.0, dated Apr. 1, 2016, 7 pages.
Great Britain Search Report for related Application On. GB1517843.7, dated Feb. 23, 2016; 8 pages.
Intention to Grant in counterpart European Application No. 14157971.4 dated Apr. 14, 2015, pp. 1-8.
International Search Report for PCT/US2013/039438 (WO2013166368), Oct. 1, 2013, 7 pages.
Office Action received for European Application No. 16168216.6, dated Feb. 27, 2017, 5 pages.
Peter Clarke, Actuator Developer Claims Anti-Shake Breakthrough for Smartphone Cams, Electronic Engineering Times, p. 24, May 16, 2011.
Search Report and Opinion in Related Ep Application 15176943.7, dated Jan. 8, 2016, 8 pages.
Search Report and Opinion in related GB Application No. 1517112.7, dated Feb. 19, 2016, 6 pages.
Second Chinese Office Action in related CN Application No. 2015220810562.2, dated Mar. 22, 2016, 5 pages. English Translation provided [No references].
U.S. Patent Application for a Laser Scanning Module Employing an Elastomeric U-Hinge Based Laser Scanning Assembly, filed Feb. 7, 2012 (Feng et al.), U.S. Appl. No. 13/367,978.
U.S. Patent Application for Multifunction Point of Sale Apparatus With Optical Signature Capture filed Jul. 30, 2014 (Good et al.), U.S. Appl. No. 14/446,391.
U.S. Patent Application for Multipurpose Optical Reader, filed May 14, 2014 (Jovanovski et al.), U.S. Appl. No. 14/277,337.
U.S. Patent Application for System and Method for Measuring Irregular Objects with a Single Camera filed Jan. 28, 2014 (Li et al.), U.S. Appl. No. 14/165,980.
U.S. Patent Application for Terminal Having Illumination and Focus Control filed May 21, 2014 (Liu et al.), U.S. Appl. No. 14/283,282.
U.S. Patent Application Reading Apparatus Having Partial Frame Operating Mode tiled Apr. 11, 2014, (Deng et al.), U.S. Appl. No. 14/250,923.
Ward, Benjamin, Interactive 3D Reconstruction from Video, Aug. 2012, Doctoral Thesis, Univesity of Adelaide, Adelaide, South Australia, 157 pages.
Wikipedia, Yuv description and definition, downloaded from http://www.wikipeida.org/wiki/Yuv on Jun. 29, 2012, 10 pages.
Yuv Pixel Format, downloaded from http://www.fource.org/yuv.php on Jun. 29, 2012; 13 pages.
Yuv to RGB Conversion, downloaded from http://www.fource.org/fccyvrgb.php on Jun. 29, 2012; 5 pages.
U.S. Appl. No 14/715,916, May 19, 2015, U.S. Pat. No. 9,786,101, Patented.

* cited by examiner

EVALUATING IMAGE VALUES

CROSS-REFERENCE TO RELATED APPLICATION

The present application claims the benefit of U.S. patent application Ser. No. 14/715,916 for Evaluating Image Values filed May 19, 2015 (and published Nov. 24, 2016 as U.S. Patent Publication No. 2016/0343176), now U.S. Pat. No. 9,786,101. Each of the foregoing patent application, patent publication, and patent is hereby incorporated by reference in its entirety.

TECHNOLOGY FIELD

The present invention relates generally to imaging. More particularly, example embodiments of the present invention relate to evaluating image data.

BACKGROUND

Generally speaking, logistical processes increase efficiency and reduce cost of commerce in relation to storing inventory and transporting cargo. For example, storage space is finite and transport media, such as trailers, have specified capacities. Logistic processing apportions cargoes and inventories efficiently over the available spaces, which can facilitate storage and expedite transport.

To apportion a cargo or inventory, dimensions of each of the constituent packages, boxes, crates and other items ("items") are measured. The measured dimensions are processed in relation to the available storage or transport space. Based on the processing, a position within the storage/transport space is computed that optimizes placement of each inventory/cargo item relative to each of the other items.

The measuring of the dimensions of the cargo/inventory items may be automated by a dimensioning apparatus ("dimensioner"), which may be operable optically. Optically based dimensioners are typically operable for capturing image data using photographic and/or videographic techniques. Image data captured in relation to surfaces of the cargo/inventory items are used for computing the measurements.

Dimensioners capture the image data over two or more measurably sufficient ("good") surfaces of the cargo/inventory items to produce measurements with levels of accuracy sufficient for commercial application. Use of three good surfaces may improve measurement accuracy for commerce. In some situations, however, dimensioners may sometimes capture substantially inaccurate ("false") image data.

Computations based on the false captured image data produce inaccurate measurements of the dimensions of the items, which can cause faulty cargo/inventory apportioning. Excessive false image value production levels are thus unacceptable with dimensioners certified for commercial use, e.g., under the National Type Evaluation Program (NTEP) of the (U.S.) National Council on Weights and Measures.

On the contrary, NTEP certified dimensioners rely on consistently reliable measurement accuracy and thus, in the image values on which the measurements are based. Dimensioners may be deployed in industrial settings, e.g., in which they capture the image data from cargo/inventory items as the items are moved on high speed conveyors. Such usage however may sometimes degrade the accuracy of image based measurements.

For example, images captured by the dimensioner from an item that is beyond an optical range limit may lack sufficient structured light information for accurate measurement. Even with sufficient structured light information, accuracy may be affected by an orientation of an item relative to the dimensioner. For example, a dimensioner oriented straight-on to one face of an item may measure its depth inaccurately.

Therefore, a need exists for evaluating image data, captured from items examined by dimensioners, in relation to suitability of the data for computing accurate dimension measurements therewith. A need also exists for recognizing false values in the image data captured by the dimensioners and rejecting use of the false values in computing dimension measurements. Further, a need exists for recommending and/or implementing corrections in relation to the false image data, in order to produce accurate dimension measurements.

SUMMARY

Accordingly, in one aspect, the present invention embraces evaluating image data, captured from items examined by dimensioners, in relation to suitability of the data for computing accurate dimension measurements therewith. In an example embodiment, dimensioners are thus operable for recognizing false values in the image data captured therewith dimensioners and rejecting the false values for dimension measurement computations. Further, the dimensioners are operable for correcting the captured image data and computing accurate dimension measurements based on the corrected values.

Images of items are evaluated. A first image of the item, having a view of two or more (e.g., three) of its surfaces, is captured at a first time. A measurement of at least one dimension of one or more of the surfaces is computed and stored. A second image of the item, having a view of at least one of the two or more surfaces, is captured at a second time, subsequent to the first time. A measurement of the dimension is then computed and compared to the stored first measurement and evaluated based on the comparison.

An example embodiment of the present invention relates to a method for evaluating images of items. A first image of the item, having a view of two or more of its surfaces, is captured at a first time. A measurement of at least one dimension of one or more of the two or more surfaces is computed based on the first captured image and stored. A second image of the item, having a view of at least one of the two or more surfaces, is captured at a second time, which is subsequent to the first time. A measurement of the at least one dimension of the at least one of the two or more surfaces is computed. The computed measurement of the at least one dimension of the at least one of the two or more surfaces is compared to the stored first measurement. The computed measurement of the at least one dimension of the at least one of the two or more surfaces is evaluated based on the comparison.

The evaluating step comprises, selectively, accepting or rejecting the computed measurement of the at least one dimension of the at least one of the two or more surfaces. The captured first image and/or the captured second image each comprise information based on data relating to a characteristic of the item, and/or data relating to a wireframe model constructed of the imaged item. The information relates to one or more features of one or more surfaces of the item. The one or more surface features relate to a corresponding color or other chromatic or similar characteristic. Alternatively or additionally, the one or more surface features comprise a logo, a bar code pattern ("barcode"), or a text based, alphanumeric, ideographic, or pictographic symbol. The symbol may comprise handwritten or preprinted writing.

In an example embodiment, the comparing step comprises computing a duration of an interval between the second time and the first time. The evaluating step may comprise establishing an identity between a representation of the item in the second image with a representation of the item in the first image.

The evaluation of the image may also comprise delineating a boundary about a periphery of the one or more surface features in the first captured image. The delineated boundary is mapped to corresponding locations in a coordinate system. Data corresponding to the mapped boundary is stored.

The surface feature is then recognized in the captured second image. Data corresponding to the boundary is surveyed in relation to the recognized surface feature. The surveyed boundary data is compared to the stored boundary data. The evaluating step is then based, at least partially, on the comparison of the surveyed boundary data to the stored boundary data.

The evaluation of the images may also comprise capturing at least a third image of the item at a corresponding (e.g., third) time, which occurs between the first time and the second time. The at least third image comprises a view of the at least one of the two or more surfaces. A measurement of the at least one dimension of the at least one of the two or more surfaces is computed based on the captured at least third image. The measurement computed based on the captured at least third image is compared to the stored first measurement. The measurement computed based on the captured at least third image may be approved based on the comparison to the stored first measurement and stored.

A mean value is computed based on the stored first measurement and the stored approved measurement (from the captured at least third image). In an example embodiment, the evaluated measurement (from the second captured image) may be corrected based on the computed mean value.

An example embodiment may be implemented in which the capturing of the first image step comprises recording the view of the two or more surfaces of the item from a perspective associated with a first position of the item. The capturing of the second image step comprises recording the view of the at least one of the two or more surfaces from a perspective associated with a second position of the item. The second position is displaced (e.g., laterally, longitudinally, axially, etc.) relative to the first position.

The evaluation of the image may comprise certifying, based on the evaluating step, a charge for a commercial transaction relating to one or more of storing or transporting the item. Alternatively or additionally, the evaluation of the image may comprise certifying, based on the evaluating step, a dimensioner for a commercial use.

In another aspect, the present invention embraces a non-transitory computer readable storage medium comprising instructions, which are operable when executing on a computer processor for causing and/or controlling a process for evaluating images (e.g., as summarized above).

In yet another aspect, the present invention embraces a computer system comprising a bus component and a processor component coupled to the bus. The computer system also comprises a non-transitory storage medium component coupled to the bus component. The storage component comprises instructions, which are operable when executing on the processor component for causing and/or controlling a process for evaluating images (e.g., as summarized above).

The foregoing illustrative summary, as well as other example features, functions and/or aspects of embodiments of the invention, and the manner in which the same are accomplished, are further explained within the following detailed description of example embodiments and each figure (FIG.) of the accompanying drawings.

DETAILED DESCRIPTION OF EXAMPLE EMBODIMENTS

Example embodiments of the present invention are described in relation to evaluating image data, captured from items examined by dimensioners. Suitability of the data is thus evaluated for computing accurate dimension measurements therewith. In an example embodiment, dimensioners are thus operable for recognizing false values in the image data captured therewith dimensioners and rejecting the false values for dimension measurement computations. Further, the dimensioners are operable for correcting the captured image data and computing accurate dimension measurements based on the corrected values.

Overview.

Example embodiments are described in relation to evaluating images of items. A first image of the item, having a view of two or more of its surfaces, is captured at a first time. A measurement of at least one dimension of one or more of the surfaces is computed and stored. A second image of the item, having a view of at least one of the two or more surfaces, is captured at a second time, subsequent to the first time. A measurement of the dimension is then computed and compared to the stored first measurement and evaluated based on the comparison.

An example embodiment of the present invention uses information accessed by a dimensioner from previous images to evaluate a present image. The present image is evaluated whether a user of the dimensioner is triggering the dimensioner to make a measurement related to an item in the present image, or not. The information accessed by the dimensioner can be wireframe-based and/or image based. The wireframe based information may be economical in relation to computational resources. The image based information may give a higher confidence in decisions relating to rejecting an image or a measurement made therewith.

Example Dimensioner and Image Views.

Figure 1:
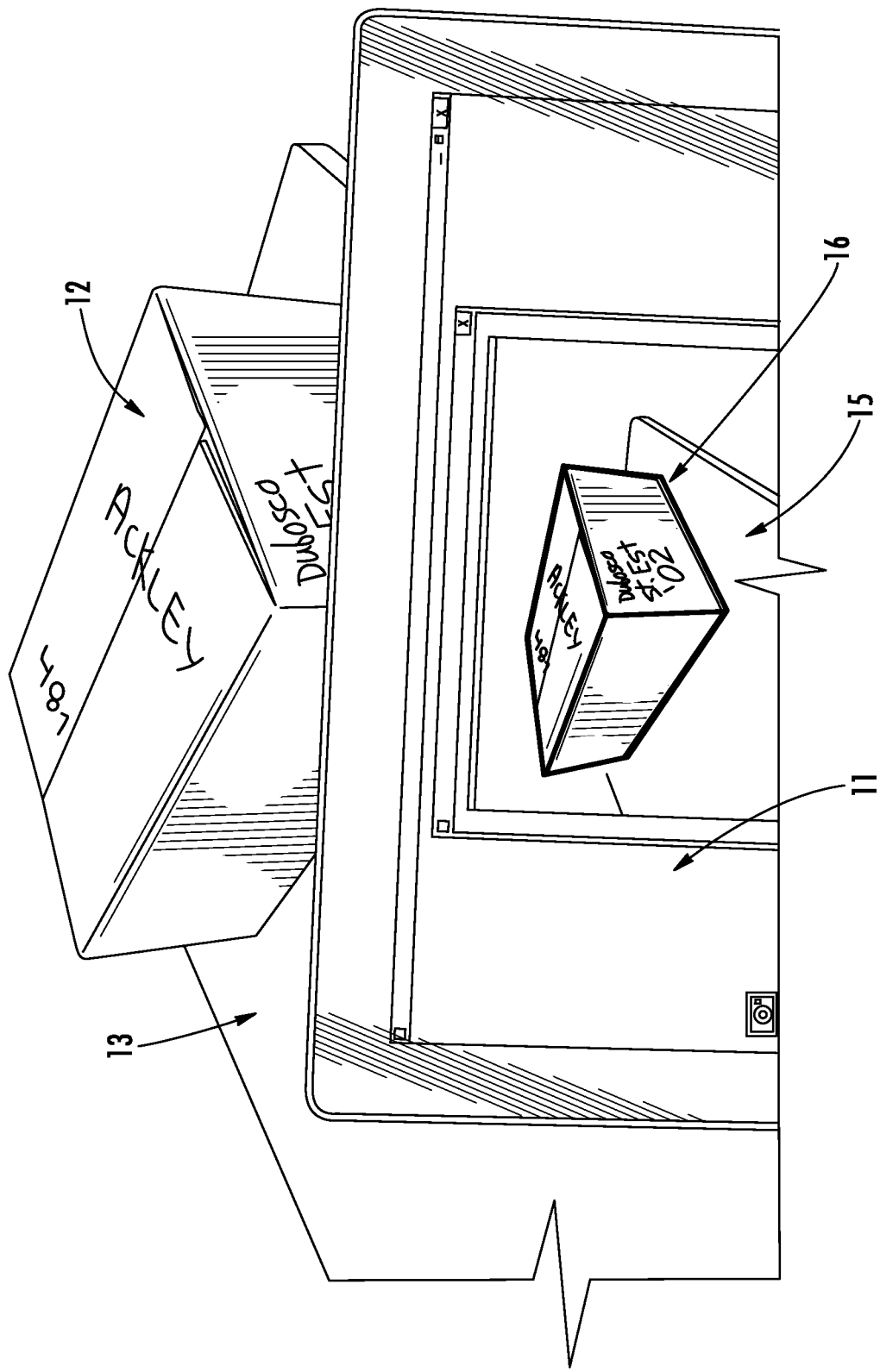
FIG. 1 depicts an example first view, according to an embodiment of the present invention.

An item with which an example embodiment may be operable may comprise a box, a crate, or another a package associated with an inventory to be stored or a cargo to be shipped or transported. FIG. 1 depicts an example first view 10, according to an embodiment of the present invention. A typical item may comprise a box, a crate, or another a package associated with an inventory to be stored or a cargo to be shipped or transported.

The first view 10 shows an image 15 of an item 12, which comprises a box, rendered on a display screen of an example dimensioner 11. While depicted herein as a tablet computer, the dimensioner 11 may comprise another mobile device or a computer apparatus (or component thereof) disposed or deployed in a fixed location. Three (3) sides of the item 12 are visible as well as a "floor" 13, which is representative of any surface or structure supporting the weight of the item 12. The dimensioner 11 is shown in the foreground of the image 15, which shows the box item 12 on the floor 13, which in the view 10 comprises a table surface. The image 15 shows a good wireframe 16, which is delineated about a periphery of the item 12 conforming to its three visible sides. The dimensions of the box item 12, as shown in the image 15, are accurate and thus suitable for commercial use.

Figure 2:
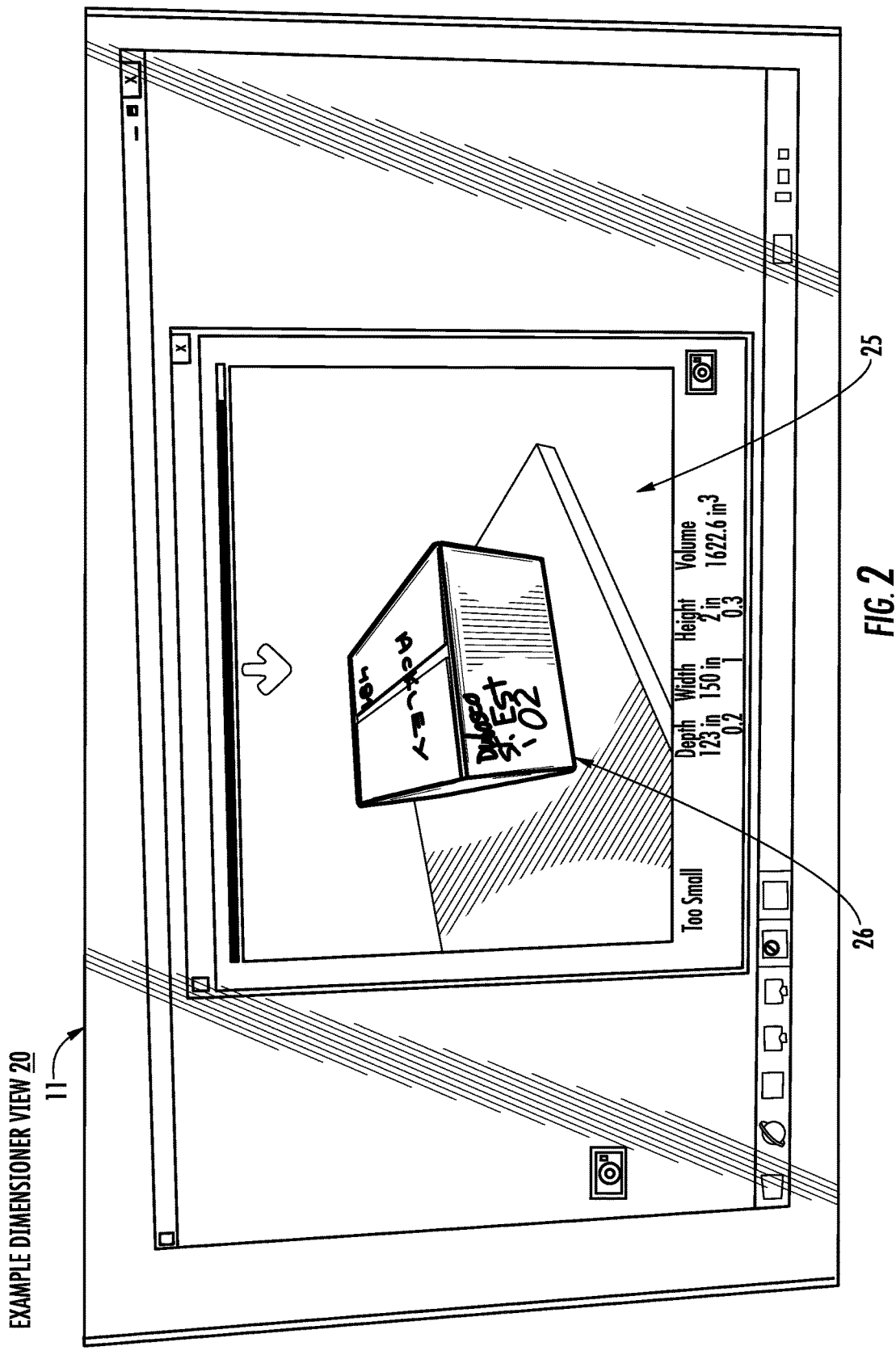
FIG. 2 depicts an example second view, according to an embodiment of the present invention.

FIG. 2 depicts an example second view 20, according to an embodiment of the present invention. In the second view 20, the box item 12 is rendered from a perspective associated with a movement of a user of the dimensioner to their own right, relative to the first view 10 (FIG. 1). The dimensions shown in the second view 20 are identical to those shown in the first view 10 (FIG. 1), in which the item 12 occupies a first position.

The position of the item 12 shown in the second view 20 is displaced axially, relative to its position as shown in the first view 10. Wireframe dimensions may be compared from images of the item 12 taken ("captured") over each of multiple positions, which helps confirm that the dimensioner 11 is, in fact, imaging the same box in each of the views. Thus, an example embodiment may be implemented in which an identity is established between an item 12 shown in a present image and the item, as shown in previous images.

Thus, while the view 20 shows the same box item 12 from a perspective that offers a slightly less optimal angle than the perspective shown in the view 10, the dimensions of the item 12 may be computed to be the same as the dimensions computed from the view 10 (FIG. 1). The use of the wireframe information, and a computation of the time interval between the capture of the image 25 and the capture of the image 15 (FIG. 1), build a confidence that the box item 12 in the image 25 share an identity, e.g., that the item 12 has not changed from one image to the next.

In an example embodiment, stronger confirmation as to the identity of the item 12 over multiple images captured at different corresponding times is implemented by comparing features of the surface of the item 12 over each of the images. A boundary may thus be delineated around the surface features. For example, bounding lines may be created around surface features based on a color or another chromatic (or other) characteristic associated with each feature. Thus, the boundaries are delineated about each feature distinguished by, e.g., the different colors. The boundaries of the surface features are then mapped to a coordinate system based on the wireframe and stored.

Figure 3:
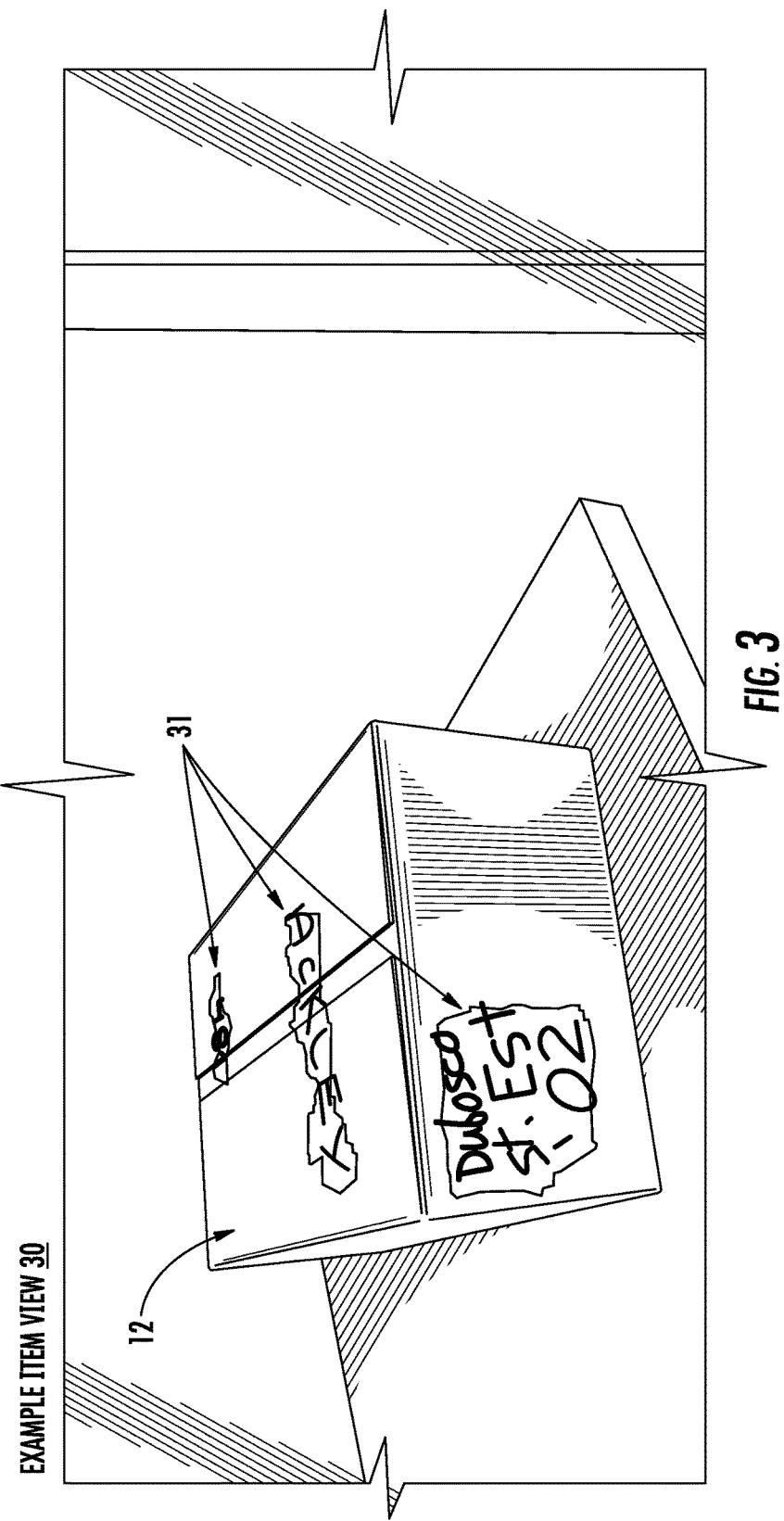
FIG. 3 depicts an example item view, according to an embodiment of the present invention.

FIG. 3 depicts an example view 30 of an item 12, according to an embodiment of the present invention. The view depicts bounding boxes 31, delineating each of multiple surface features of the item 12. The features can be handwritten or preprinted text, logos, and/or barcodes. The text and logos may comprise alphanumeric, ideographic, and/or pictographic symbols, icons, emblems or the like.

Bounding boxes delineated around printed text or other surface features are used for comparing sequential images to build confidence that in the identity of the box item 12 is the same, whether or not a user of the dimensioner 11 executes a "make measurement" command therewith.

Images captured from some perspectives may lack sufficient information for computing accurate measurements of a dimension of the item 12. For example, a user may continue around the item to a point at which the dimensioner 11 faces only a single end of a box item. A measurement of a depth dimension made from such a perspective may comprise erroneous information.

Erroneous measurements computed during a certification process of the dimensioner typically cause its failure. Erroneous measurements computed during commercial transactions, e.g., in relation to assessing charges for storage and/or transport of the item, cause inaccuracies such as insufficient revenue capture or overcharging.

Figure 4:
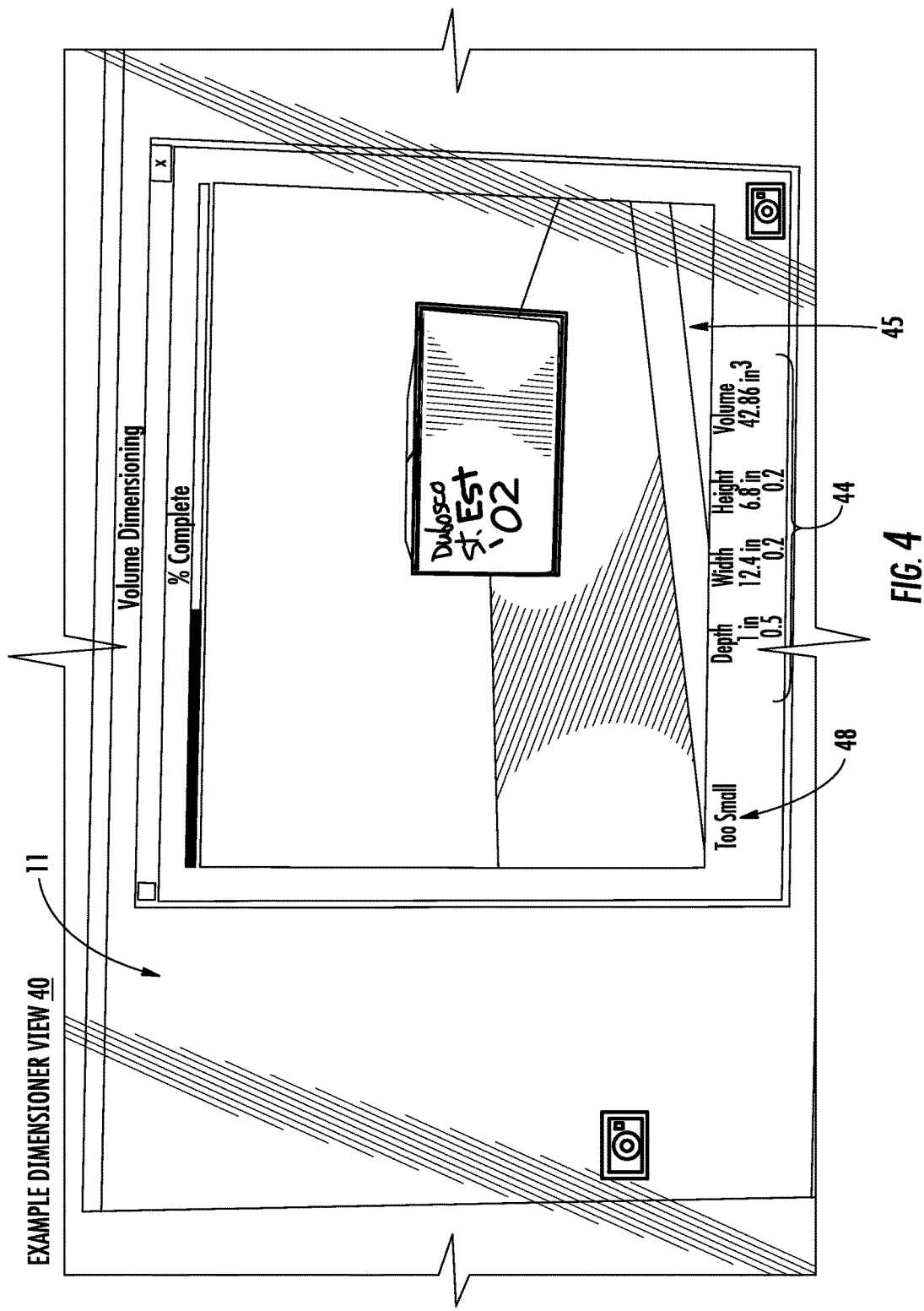
FIG. 4 depicts an example dimensioner view, according to an embodiment of the present invention.

FIG. 4 depicts an example view 40 on the dimensioner 11, according to an embodiment of the present invention. The view 40 shows a perspective of the item 12 in which the user has moved the dimensioner 11 to face a side of the box item straight-on. While the item 12 has not changed and thus, shares an identity with the boxes shown in the other views 10, 20 and 30 (FIGS. 1, 2 and 3, respectively) the depth displayed among the dimensions 44 is incorrect and is reported as having insufficient size ("too small").

In example embodiments, this incorrect depth measurement is rejected and deleted from display. Sequential wireframes computed from images captured at various corresponding times, and/or comparing markings on the box or other surface features of the item 12, are used to reject the depth measurement.

An example embodiment of the present invention relates to a method for evaluating the image data for accepting or rejecting dimension measurements therewith. The example process, and non-transitory computer readable storage media comprising instructions, e.g., software associated with the dimensioner 11, are operable for making related judgments appropriately. Moreover, an example embodiment is implemented in which the instructions are configured to correct the depth measurement. For example, an average of related depth measurements computed from preceding images may be used to provide the correct measurement of the depth dimension.

Example Processes.

An example embodiment of the present invention relates to a computer implemented method for evaluating image data, captured from items examined by dimensioners, in relation to suitability of the data for computing accurate dimension measurements therewith. The method may relate to a process executing on a computer system, which is configured operably as a dimensioner.

An example embodiment is implemented, in which a dimensioner is thus operable for recognizing false values in the image data captured therewith dimensioners and rejecting the false values for dimension measurement computations. Further, the dimensioners are operable for correcting the captured image data and computing accurate dimension measurements based on the corrected values.

Figure 5:
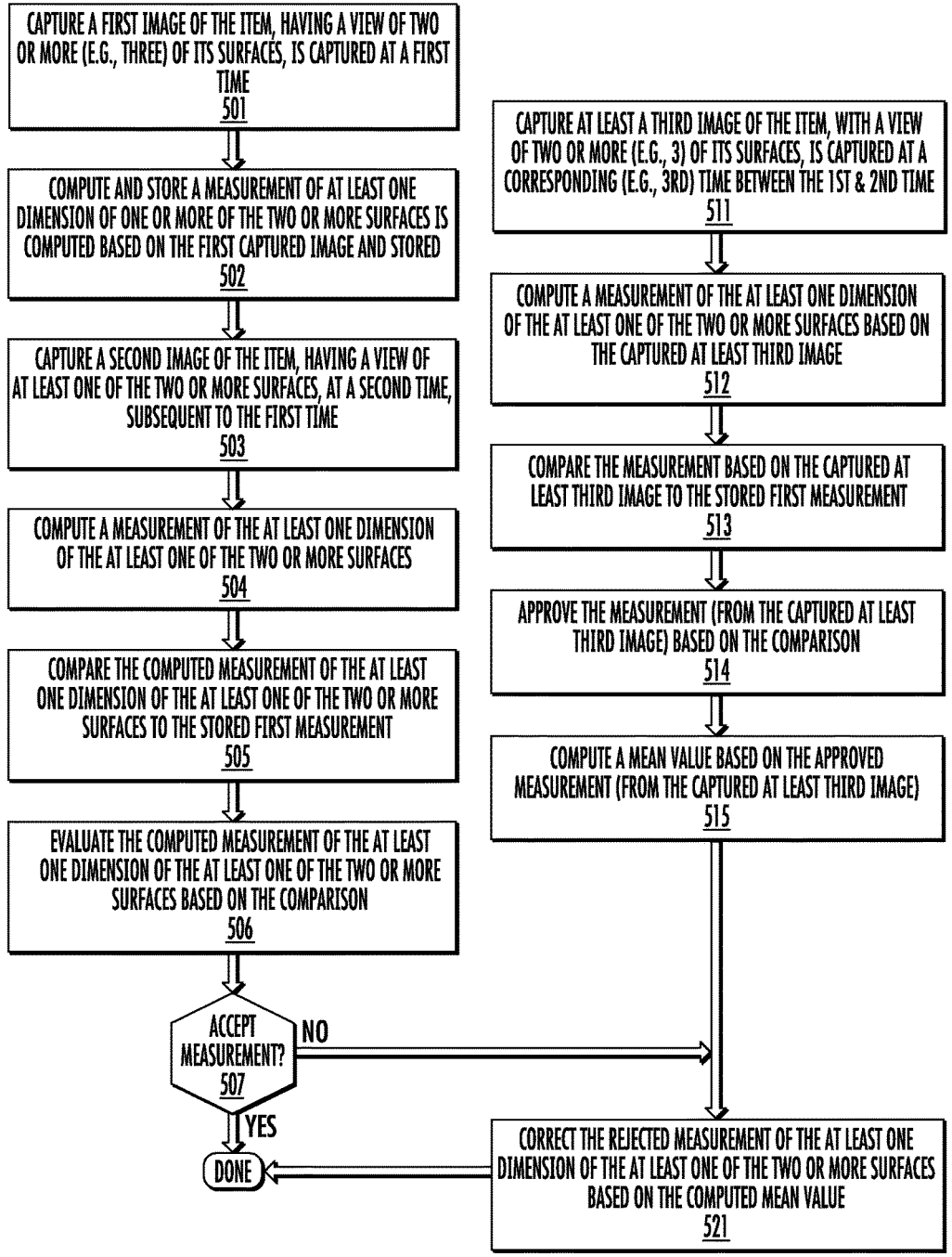
FIG. 5 depicts a flowchart for an example process for evaluating an image, according to an embodiment of the present invention.

FIG. 5 depicts a flowchart for an example process 500 for evaluating an image, according to an embodiment of the present invention.

In step 501, a first image of the item, having a view of two or more (e.g., three) of its surfaces, is captured at a first point in time.

In step 502, a measurement of at least one dimension of one or more of the surfaces is computed and stored.

In step 503, a second image of the item, which has a view of at least one of the two or more surfaces, is captured at a second point in time. The second point in time is subsequent to the first point in time.

In step 504, a measurement of the at least one dimension of the at least one of the two or more surfaces is computed from the captured second image.

In step 505, the computed measurement of the at least one dimension of the at least one of the two or more surfaces is compared to the stored first measurement.

In step 506, the computed measurement of the at least one dimension of the at least one of the two or more surfaces is evaluated based on the comparison.

In step 507, the evaluating step 506 relates to a selective acceptance or rejection of the computed measurement of the at least one dimension of the at least one of the two or more surfaces. If the computed measurement is accepted, then the process 500 may be complete.

Example embodiments may be implemented in which the captured first image and/or the captured second image each comprise information based on data relating to a characteristic of the item. Alternatively of additionally, the captured first image and/or the captured second image each comprise information based on data relating to a wireframe model of the item constructed in relation to the captured images.

The information may relate to one or more features of one or more surfaces of the item. The one or more surface features may relate to a corresponding chromatic (color related) characteristic visible on the surface. Alternatively or additionally, the one or more surface features comprise a logo, a barcode pattern, or a text based, alphanumeric, ideographic, or pictographic symbol. The symbol may comprise handwritten or preprinted writing, an emblem, icon, or the like.

In an example embodiment, the comparing step comprises computing a duration of an interval between the second time and the first time. The evaluating step may comprise establishing an identity between a representation of the item in the second image with a representation of the item in the first image using the computed interval duration. For example, the identity of the item may thus be confirmed as not having changed from the first image, captured at the first time, to the second image, captured at the subsequent second time.

The evaluation of the image at step 501 may be based, at least in part, on analysis related to one or more visible features that appear on the surface of the item. The analysis of the surface features may be implemented as described, for example below, in relation to a process 60 (FIG. 6).

Figure 6:
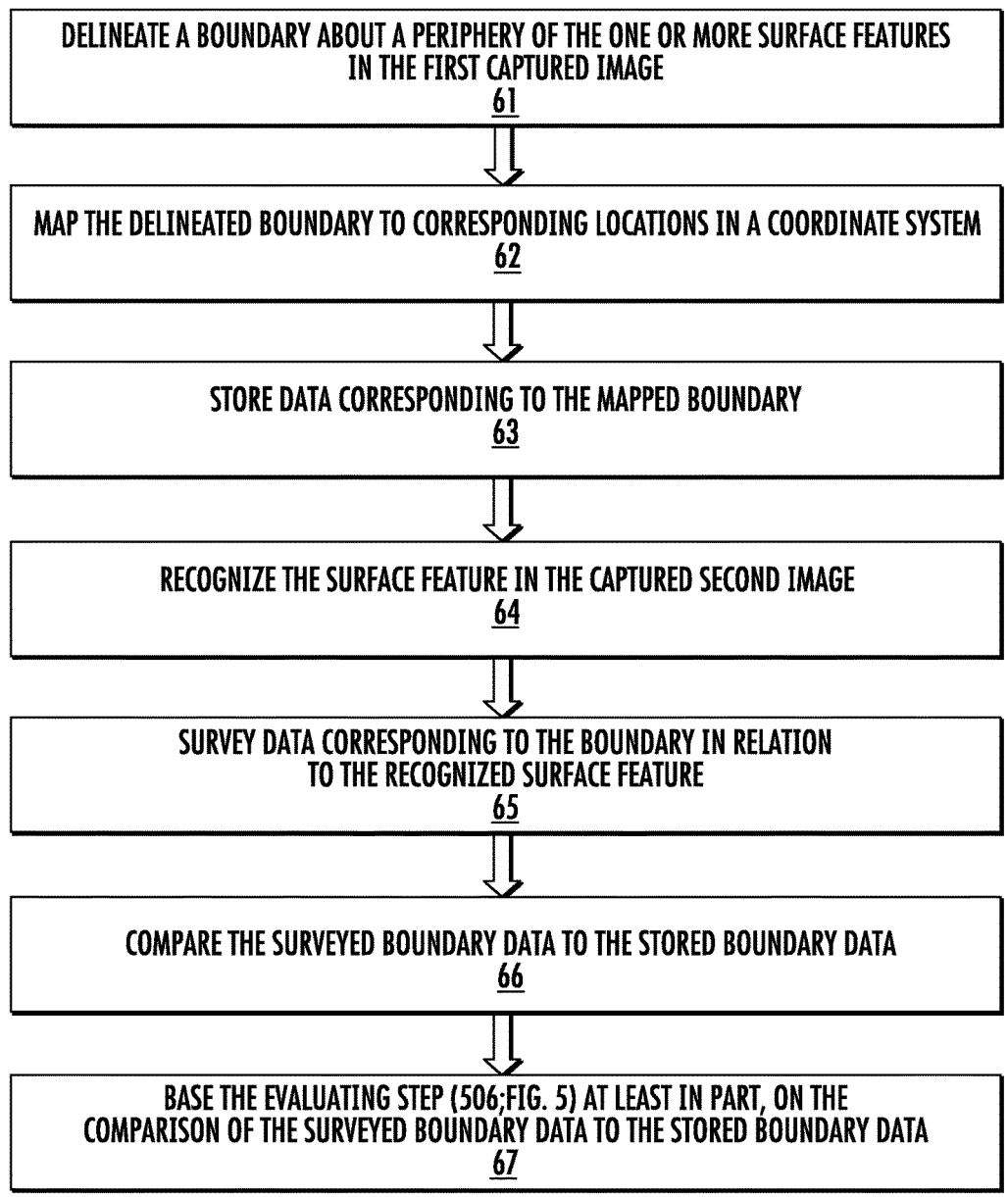
FIG. 6 depicts a flowchart for an example process for capturing data relating to a surface feature of an item, according to an embodiment of the present invention.

FIG. 6 depicts a flowchart for an example process 60 for capturing data relating to a surface feature of an item, according to an embodiment of the present invention.

In step 61, a boundary about a periphery of the one or more surface features of the item is delineated in the first captured image. For example, boundary lines may be created about (e.g., around, surrounding, proximate to a periphery of, etc.) the surface feature(s).

In step 62, the delineated boundary is mapped to corresponding locations in a coordinate system.

In step 63, data corresponding to the mapped boundary is stored. For example, the mapped boundary data may be stored in a non-transitory computer readable storage medium such as a memory and/or a drive or flash related storage unit or the like.

In step 64, the surface feature is recognized in the captured second image.

In step 65, data corresponding to the boundary is surveyed in relation to the recognized surface feature. Upon the recognition of the surface feature in the captured second image for example, a survey feature of dimensioner software may be operable for scanning the recognized surface feature in relation to the boundary about its periphery, as it may appear in a perspective shown in a view corresponding to the captured second image.

In step 66, the surveyed boundary data is compared to the stored boundary data.

In step 67, the evaluating step is based, at least in part, on the comparison of the surveyed boundary data to the stored boundary data.

Referring again to FIG. 5, the evaluation of the computed measurement of the at least one dimension of the at least one of the two or more surfaces shown in the captured second image may also comprise a rejection thereof in the decision step 507. An example embodiment may be implemented in which the process 500 is operable for correcting the rejected dimension.

In step 511 for example, at least a third image of the item is captured at a corresponding (e.g., third) point in time. The third (or other corresponding) point in time is subsequent to the first point in time, but occurs prior to the second point in time. Thus, the third (or other corresponding) point in time occurs between the first point in time and the second point in time. The captured at least third image comprises a view of the at least one of the two or more surfaces.

In step 512, a measurement of the at least one dimension of the at least one of the two or more surfaces is computed based on the captured at least third image.

In step 513, the measurement computed based on the captured at least third image is compared to the stored first measurement.

In step 514, the measurement computed based on the captured at least third image is approved based on the comparison to the stored first measurement and stored (e.g., based on an independent evaluation thereof, which occurs prior to the evaluation step 506).

In step 515, a mean value is computed based on an average of the stored first measurement and the stored approved measurement from the captured at least third image.

In step 521, the evaluated measurement (which was rejected in step 507) is corrected based on the computed mean value. Upon the correction of the measurement, the process 500 may then be complete.

An example embodiment may be implemented in which the capturing of the first image step comprises recording the view of the two or more surfaces of the item from a perspective associated with a first position of the item.

The capturing of the second image step comprises recording the view of the at least one of the two or more surfaces from a perspective associated with a second position of the item. The second position is displaced (e.g., laterally, longitudinally, axially, etc.) relative to the first position.

The evaluation of the image may comprise certifying, based on the evaluating step, a charge for a commercial transaction relating to one or more of storing or transporting the item. Alternatively or additionally, the evaluation of the image may comprise certifying, based on the evaluating step, a dimensioner for a commercial use.

An example embodiment may be implemented in which the process 500 and the process 60 (FIG. 6) are performed, executed, controlled, caused, and/or triggered by a processor component of a computer system. The processor component is operable for executing or performing the process 500 and the process 60 based on instructions stored tangibly (electronically, electrically, magnetically, optically, physically, etc.) as features of a non-transitory computer readable storage medium component.

Example Computer System and Network.

Figure 7:
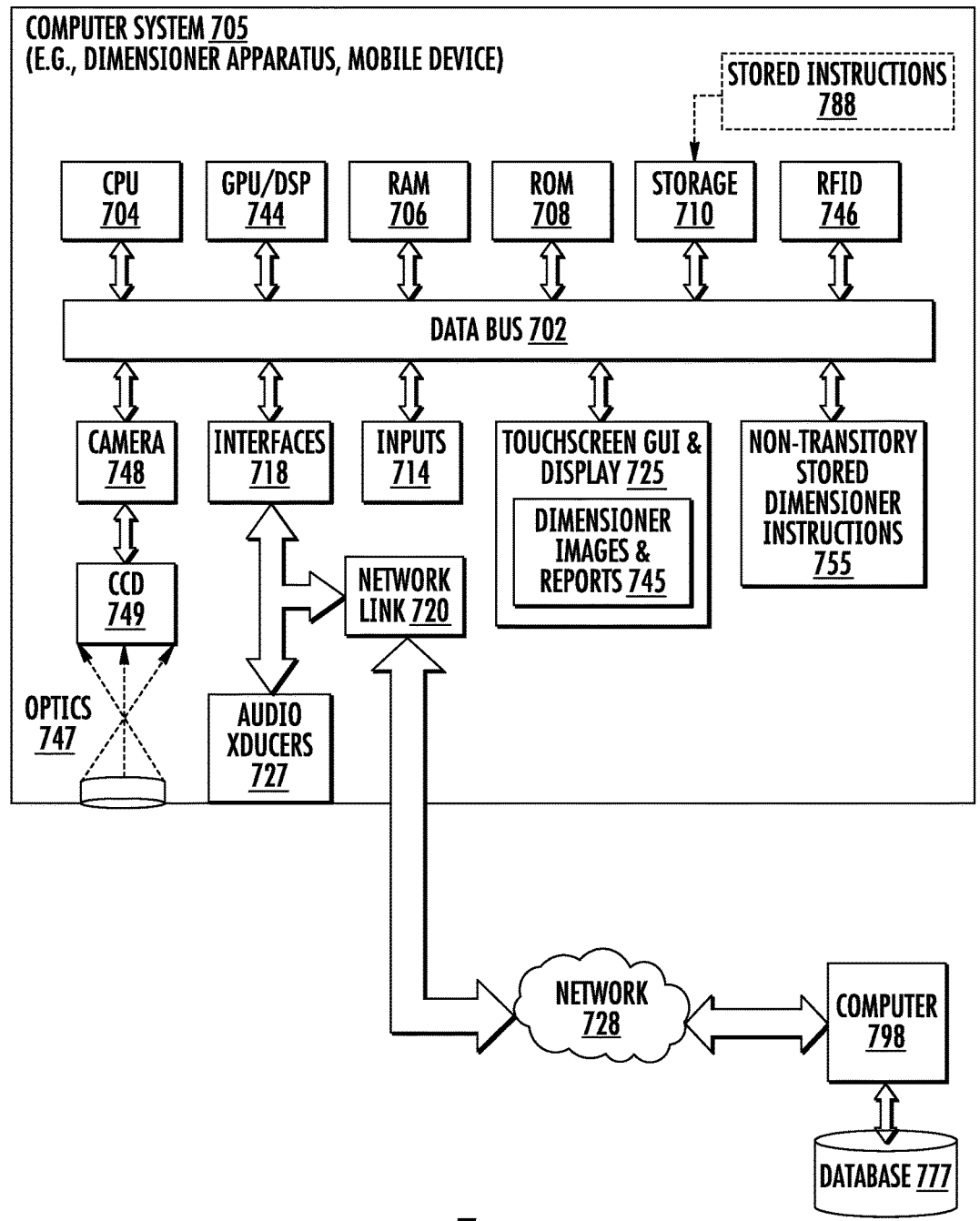
FIG. 7 depicts an example computer system, which is operable as a dimensioner according to an embodiment of the present invention.

FIG. 7 depicts an example computer network 700, according to an embodiment of the present invention. The computer network comprises a data network 728, and a first computer system 705, which is coupled communicatively thereto. At least a second computer 798 may also be coupled communicatively to the data network 728.

The first computer system 705 is configured operably (e.g., by software code with which it is programmed) as a dimensioner. The first computer system ("dimensioner") 705 may comprise a mobile device such as a tablet computer, portable data terminal (PDT), smartphone, portable (or personal) digital assistant (PDA) and/or another mobile or portable computing apparatus. The dimensioner 705 may also comprise a fixed or substantially stationary computer system or component thereof. The dimensioner 705 may thus be deployed, disposed, and operated in a fixed location. The fixed location may be disposed in proximity to a site associated with a storage or transport related portal. The storage or transport portal may be associated with a logistic, commercial, industrial, agricultural, military, laboratory (e.g., certification) setting or another facility.

The dimensioner 705 is operable for communicating with other devices, such as the at least one computer 798. The dimensioner 705 is coupled communicatively via the network 728 with the computer 798. The network 728 may comprise a packet-switched data network operable based on transfer control and internetworking protocols (e.g., TCP/IP).

The data network 728 may comprise a portion of one or more other networks and/or two or more sub-network ("subnet") components. For example, the data network 728 may comprise a portion of the internet and/or a particular wide area network (WAN). The network 728 may also comprise one or more WAN and/or local area network (LAN) subnet components. Portions of the data network 728 may be operable wirelessly and/or with wireline related means. The data network 728 may also comprise, at least in part, a digital telephone network.

The at least second computer ("computer") 798 may comprise a mobile device. The computer 798 may also be located at a particular location, where it may be disposed in a more or less fixed, or at least stationary position or configuration. In relation to the dimensioner 705, the computer 798 may also be operable as a server and/or for performing one or more functions relating to control or centralized pooling, processing or storage of information gathered or accessed therewith, e.g., with a database 777.

For example, embodiments of the present invention may be implemented in which the dimensioner 705 is operable for sending reports 745 relating to data corresponding to the evaluation of the captured images to the computer 798 over the network 728. The computer 798 may then store the image evaluation related data in the database 777, from which it may be retrieved at a later time. The data retrieved from the database 777 may be used in evaluating other (e.g., subsequent) images.

The dimensioner 705 may also be operable for capturing images photographically (including recording video) and/or scanning and reading barcode patterns and other data presented by graphic media. The dimensioner 705 may also comprise a component 746, which is operable for scanning radio frequency identification (RFID) tags and processing data associated therewith.

The images and data associated with the barcode and/or RFID tags may be sent to the computer 798. In addition to capturing and evaluating images, the dimensioner 705 may also use scanned barcodes (and RFIDs) for reading data (e.g., inventory information, price, etc.) therefrom in relation to associated items (e.g., packages, stock, products, commodities, parts, components, etc.).

The dimensioner 705 may then send the image evaluation report 745, data relating thereto, and/or the scan related data to the computer 798 over the network 728 wirelessly, via the network 728, to the computer 798.

Upon receipt thereof, the computer 798 may be operable for processing the data related to the image evaluations and the scan related data. The scan data may relate to the image evaluation. For example, the scan data may relate to the captured images, measurements associated therewith, and/or surveys of boundaries or other information related to surface features of an item.

The scan data may relate to commercial transactions relating to the transport and/or storage of an item. The scan data may also relate to a sale, transfer or other disposition of the item and associated with the barcode or RFID tag. The processing of the data may thus allow, for example, updating the database 777 in relation to inventory, tracking shipments, etc.) based on the image evaluation and other aspects of the item associated with the scanned surface features and the barcodes (or RFID tags).

The dimensioner 705 comprises a plurality of electronic components, each of which is coupled to a data bus 702. The data bus 702 is operable for allowing each of the multiple, various electronic components of the dimensioner 705 to exchange data signals conductively with each of the other electronic components thereof.

The electronic components of the dimensioner 705 may comprise integrated circuit (IC) devices, including one or more microprocessors. The electronic components of the dimensioner 705 may also comprise other IC devices, such as a microcontroller, field-programmable gate array (FPGA) or other programmable logic device (PLD) or application-specific IC (ASIC).

The microprocessors include a central processing unit (CPU) 704. The CPU 704 is operable for performing general data processing functions related to operations of the dimensioner 705. The electronic components of the dimensioner 705 may also comprise one or more other processors 744. The other microprocessors may also include a graphic processing unit (GPU) and/or digital signal processor (DSP) 704, which are each operable for performing data processing functions that may be somewhat more specialized than the general processing functions, as well as sometimes sharing some of the general processing functions with the CPU 704.

One of the processors 744 may also be operable as a "math" (mathematics) coprocessor. The math co-processor, DSP and/or GPU ("DSP/GPU") 744 are operable for performing computationally intense data processing. The computationally intense processing relates to imaging, image evaluation, graphics, dimension measurements, wireframe manipulations, coordinate system management, logistics, and other (e.g., mathematical, financial) information.

The data processing operations comprise computations performed electronically by the CPU 704 and the DSP/GPU 744. For example, the microprocessors may comprise components operable as an arithmetic logic unit (ALU), a floating point logic unit (FPU), and associated memory cells.

The memory cells comprise non-transitory data storage media, which may be configured as caches (e.g., "L1," "L2"), registers, latches and/or buffers. The memory cells are operable for storing data electronically in relation to various functions of the processor. For example, a translational look-aside buffer (TLB) may be operable for optimizing efficiency of use of content-addressable memory (CAM) by the CPU 704 and/or the DSP/GPU 744.

The dimensioner 705 also comprises non-transitory computer readable storage media operable for storing data, e.g., electronically. For example, the dimensioner 705 comprises a main memory 706, such as a random access memory (RAM) or other dynamic storage device 706. The main memory 706 is coupled to data bus 702 for storing information and instructions, which are to be executed by the CPU 704. The main memory 706 also may be used for storing temporary variables or other intermediate information during execution of instructions by the CPU 704. Other memories (represented in the present description with reference to the RAM 706) may be installed for similar uses by the DSP/GPU 744.

The dimensioner 705 further comprises a read-only memory (ROM) 708 or other static storage device coupled to the data bus 702. The ROM 708 is operable for storing static information and instructions for use by the CPU 704. In addition to the RAM 706 and the ROM 708, the non-transitory storage media of the dimensioner 705 may comprise at least one data storage device 710. The data storage device 710 is operable for storing information and instructions and allowing access thereto.

The data storage device 710 may comprise a magnetic disk drive, flash drive, or optical disk drive. The data storage device 710 comprises non-transitory media coupled to data bus 702, and may be operable for providing a "virtual memory" function. The virtual memory operations of the storage device 710 may supplement, at least temporarily, storage capacity of other non-transitory media, such as the RAM 706.

The non-transitory storage media of the dimensioner 705 also comprises instructions ("dimensioner instructions") 755, which is stored (e.g., electronically, magnetically, optically, physically, etc.) in relation to software for programming, controlling, and/or configuring its operations relating to evaluating images and computing measurements of items featured therein. The non-transitory dimensioner instructions 755 may also (or alternatively) be stored in association with the storage 710 and other storage components of the dimensioner 705.

Non-transitory programming instructions, software, settings and configurations related to the evaluation of images are stored (e.g., magnetically, electronically, optically, physically, etc.) by a memory, flash, or drive related non-transitory storage medium 755 and/or with the non-transitory storage medium 710. The non-transitory storage medium 710 may also store a suite 788 of instructions, which relate to a suite of other functional features with which the dimensioner 705 may also be also operable, e.g., for performing other functional features.

An example embodiment may be implemented in which the suite 788 of features relates to applications, tools and tool sets, menus (and sub-menus) and macros associated with functions of dimensioner 705 related to capturing and evaluating images. The suite 788 may also relate to scanning and reading barcode patterns and RFID tags, taking photographs, recording video and/or audio information, telephonic operations, and capturing other data related to images and presentations of graphic media and other information sources.

The dimensioner 705 comprises a user-interactive touchscreen 725, which is operable as a combined graphical user interface (GUI) and display component 725. The touchscreen 725 may comprise a liquid crystal display (LCD), which is operable for rendering images by modulating variable polarization states of an array of liquid crystal transistor components. The touchscreen 725 also comprises an interface operable for receiving haptic inputs from a user.

The haptic interface of the GUI touchscreen 725 may comprise, e.g., at least two arrays of microscopic (or transparent) conductors, each of which is insulated electrically from the other and disposed beneath a surface of the display 725 in a perpendicular orientation relative to the other. The haptic inputs comprise pressure applied to the surface of the touchscreen GUI 725, which cause corresponding local changes in electrical capacitance values proximate to the pressure application that are sensed by the conductor grids to effectuate a signal corresponding to the input.

In an example embodiment, the touchscreen GUI and display component 725 is operable for rendering graphical reports 745 in relation to dimension related image evaluations. The image evaluation reports 745 are rendered by the display 725 upon receipt of data related to the dimensioning and image evaluations from the CPU 704 and/or the GPU/DSP 744.

The touchscreen GUI component 725 may be implemented operably for rendering images over a heightened (e.g., high) dynamic range (HDR), the rendering of the images may also be based on modulating a back-light unit (BLU). For example, the BLU may comprise an array of light emitting diodes (LEDs). The LCDs may be modulated according to a first signal and the LEDs of the BLU may be modulated according to a second signal. The touchscreen 725 may render an HDR image by coordinating the second modulation signal in real time, relative to the first modulation signal.

A plurality of inputs 714 may comprise one or more electromechanical switches, which may be implemented as buttons, escutcheons, or cursor controls. The inputs 714 may also comprise a keyboard. The keyboard may comprise an array of alphanumeric (and/or ideographic, syllabary based) keys operable for typing letters, number, and other symbols. The keyboard may also comprise an array of directional (e.g., "up/down," "left/right") keys, operable for communicating commands and data selections to the CPU 704 and for controlling movement of a cursor rendering over the touchscreen GUI display 725.

The directional keys may be operable for presenting two (2) degrees of freedom of a cursor, over at least two (2) perpendicularly disposed axes presented on the display component of the touchscreen GUI 725. A first 'x' axis is disposed horizontally. A second 'y' axis, complimentary to the first axis, is disposed vertically. Thus, the dimensioner 705 is thus operable for specifying positions over a representation of a geometric plane and/or other coordinate systems.

Audio transducers ("Xducers") 727 have a microphone function and a speaker function. The microphone function is operable for transducing speech and other sound into corresponding electrical signals, which may be accessed via an interface 718 and processed by one or more of the electronic components of the dimensioner 705. The speaker function is operable for transducing audibly signals accessed via the interface 718, which were generated by the electronic components. The audio transducers and associated interface 714 thus allow the dimensioner 705 to function telephonically and in response to audio user commands.

The dimensioner 705 may be operable for scanning visual data such as barcode patterns and/or other images presented on printed graphic media and/or self-lit electronic displays. Example embodiments of the present invention also relate to the use of the dimensioner 705 for taking photographs and recording video. A camera component 748 is coupled to the data bus 702. The camera component 748 is operable for receiving data related to the scanned barcode patterns.

The camera component 748 is also operable for receiving static and dynamic image data related, respectively, to the photographs and the video. The camera component 748 may receive the data captured from an image sensor 749. The image sensor 749 may comprise an array of charge-coupled devices (CCDs), photodiodes (PDs), or active complementary metal oxide semiconductor (CMOS) based imaging devices. The image sensor 749 may be operable with a system of optical components ("optics") 747. The dimensioner and image evaluation instructions 755 and the barcode scanning (and other) feature(s) of the mobile device 700 are operable with one or more of the camera component 748, the image sensor component 749, and/or the optics 747.

The electronic components of the dimensioner 705 may also comprise an RFID scanner 746 coupled to the data bus 702. The RFID scanner 746 is operable for scanning RFID tags.

Execution of instruction sequences contained in the main memory 706 causes the CPU 704 to perform process steps associated with operations of the dimensioner 705. One or more microprocessors are operable for executing instructions contained in main memory 706. Additionally and/or alternatively, hard-wired circuitry may be used in place of, or in combination with the software instructions. Thus, the dimensioner 705 is not limited to any specific combination of circuitry, hardware, firmware, and/or software.

The term "computer readable storage medium," as used herein, may refer to any non-transitory storage medium that participates in providing instructions to the CPU 704 (and the DSP/GPU 744) for execution. Such a medium may take many forms, including but not limited to, non-volatile media, volatile media, and transmission media. Non-volatile media comprises, for example, configured/programmed active elements of the CPU 704, the DSP/GPU 744, the non-transitory stored dimensioner instructions 755 and other optical, electronic, or magnetic disks, such as storage device 710. Volatile media comprises dynamic memory associated, e.g., with the RAM 706.

Transmission media comprises coaxial cables, copper wire and other electrical conductors and fiber optics, including the wires (and/or other conductors or optics) that comprise the data bus 702.

Transmission media can also take the form of electromagnetic radiation (e.g., light waves), such as may be generated at radio frequencies (RF), and infrared (IR) and other optical frequencies. Data communications may also be effectuated using other means, including acoustic (e.g., sound related) or other mechanical, vibrational, or phonon related media.

Non-transitory computer-readable storage media may comprise, for example, flash drives such as may be accessible via universal serial bus (USB) or any medium from which a computer can read data.

Various forms of non-transitory computer readable storage media may be involved in carrying one or more sequences of one or more instructions to CPU 704 for execution. For example, the instructions may initially be carried on a magnetic or other disk of a remote computer (e.g., computer 798). The remote computer can load the instructions into its dynamic memory and send the instructions over networks 728.

The dimensioner 705 can receive the data over the network 728 and use an IR, RF or other transmitter means to convert the data to corresponding signals. An IR, RF or other signal detector or receiver ("receiver") coupled to the data bus 702 can receive the data carried in the corresponding signals and place the data on data bus 702. The operations associated with the transmitter and the receiver may be combined in a transmitter/receiver (transceiver) means. The transmitter, receiver, and/or transceiver means may be associated with the interfaces 718.

The data bus 702 carries the data to main memory 706, from which CPU 704 and the DSP/GPU 744 retrieve and execute the instructions. The instructions received by main memory 706 may optionally be stored on storage device 710 either before or after execution by CPU 704.

The interfaces 718 may comprise a communication interface coupled to the data bus 702. In addition to interfacing audio signals between the data bus 702 and the audio transducers 727, the communication interface is also operable for providing a two-way (or more) data communication coupling to a network link 720, which may connect wirelessly at radio frequencies (RF) to the network 728. Wireless communication may also be implemented optically, e.g., at IR frequencies.

In any implementation, the communication interface 718 sends and receives electrical, electromagnetic, or optical signals that carry digital data streams representing various types of information. The network link 720 provides data communication through the network 728 to other data devices. The communication interfaces 718 may also provide audio signals to the speaker 727.

The network 728 may use one or more of electrical, electromagnetic, and/or optical signals carrying digital data streams. The signals sent over the network 728 and through the network link 720 and communication interface 718 carry the digital data to and from the dimensioner 705. The dimensioner 705 can send messages and receive data, including program code, through the network 728, network link 720, and communication interface 718.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;

U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,526;
U.S. Pat. Nos. 8,798,367; 8,807,431;
U.S. Pat. Nos. 8,807,432; 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;

U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Indicia-reader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTON CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

Example embodiments of the present invention have thus been described. An example embodiment of the present invention relates to a computer implemented method for evaluating images of items. A first image of the item, having a view of two or more of its surfaces, is captured at a first time. A measurement of at least one dimension of one or more of the two or more surfaces is computed based on the first captured image and stored. A second image of the item, having a view of at least one of the two or more surfaces, is captured at a second time, which is subsequent to the first time. A measurement of the at least one dimension of the at least one of the two or more surfaces is computed. The computed measurement of the at least one dimension of the at least one of the two or more surfaces is compared to the stored first measurement. The computed measurement of the at least one dimension of the at least one of the two or more surfaces is evaluated based on the comparison. The example method may be implemented by a processor component of a computer system, based on instructions stored physically in a non-transitory computer readable storage medium component.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are unnecessary for describing example embodiments of the invention, and not particularly relevant to understanding of significant features, functions and aspects of the example embodiments described herein.

In the specification and/or figures, typical embodiments of the invention have been disclosed. The present invention is not limited to such example embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed, is:

1. A method comprising:
    capturing, by a camera, a first image of an item at a first time from a first perspective associated with a first position of the item, the first image comprising a view of at least two or more surfaces of the item;
    computing first dimensions of the item based on the first image;
    capturing, by the camera, a second image of the item at a second time from a second perspective associated with a second position of the item, wherein the first perspective and second perspective are different, and the second image comprises a view of at least one of the two or more surfaces of the item;
    computing second dimensions of the item based on the second image;
    comparing the second dimensions of the item computed based on the second image with the first dimensions of the item computed based on the first image;
    in response to determining that the second dimensions are within a predefined threshold of the first dimensions of the item based on the first image, determining that the second dimensions are acceptable for computing dimensions of the item; and
    in response to determining that the second dimensions are not within a predefined threshold of the first dimensions of the item based on the first captured image, displaying the second dimensions and the second image with a sign that indicates the second dimensions of the item are inaccurate.

2. The method of claim 1, comprising comparing one or more surface features of the item in the second image with one or more surface features of the item in the first image.

3. The method of claim 2, wherein the one or more surfaces features comprise a corresponding chromatic characteristic of the surface.

4. The method of claim 2, wherein the one or more surface features comprise at least one of a logo or a bar code pattern.

5. The method of claim 1, wherein the first image and the second image comprises data relating to a characteristic of the item or data relating to a wireframe model of the item.

6. The method of claim 5, wherein the data relates to one or more features of the one or more surfaces of the item.

7. The method of claim 2, wherein the one or more surface features relate to at least one of a text based, alphanumeric, ideographic, or pictographic symbol.

8. The method of claim 1, wherein the comparing step comprises determining if the item in first image is the same as the item in the second image.

9. The method of claim 2, comprising:
    delineating a boundary about a periphery of the one or more surface features in the first image;
    mapping the delineated boundary to corresponding locations in a coordinate system; storing data corresponding to the mapped boundary;
    recognizing the one or more surface features in the second image;
    surveying data corresponding to the boundary in relation to the recognized one or more surface features in the second image;
    comparing the surveyed boundary data to the stored boundary data, and wherein determining if the second dimensions is suitable is based on the comparison between the surveyed boundary data to the stored boundary data.

10. The method of claim 1, wherein the two or more surfaces of the item comprise at least three surfaces.

11. The method of claim 1, wherein the second position of the item in the second image is displaced relative to the first position of the item in the first image.

12. The method of claim 1, comprising certifying, based on the comparison step, a charge for a commercial transaction relating to one or more of storing or transporting the item.

13. The method of claim 1, comprising certifying, based on the comparison step, a dimensioner for a commercial use.

14. The method of claim 1, comprising:
    capturing at least one third image of the item after the first time, the third image comprising a view of two or more surfaces of the item;
    computing third dimensions of the item based on the third image;
    comparing the third dimensions of the item computed based on the third image with the first dimensions of the item computed based on the first image;
    approving and storing the measurement computed in relation to the captured at least one third image based on the comparison to the stored first measurement;

computing a mean value based on a stored first measurement and the stored approved measurement based on the least one third image; and correcting a rejected second image based on the computed mean value.

15. A dimensioning device, comprising:

a camera configured to capture images of an item;

a processor configured to:

capture, with the camera, a first image of the item at a first time from a first perspective associated with a first position of the item, the first image comprising a view of two or more surfaces of the item;

compute first dimensions of the item based on the first image;

capture, with the camera, a second image of the item at a second time which is subsequent to the first time, from a second perspective associated with a second position of item, wherein the first perspective and the second perspective are different, the second image comprises a view of at least one of the two or more surfaces;

compute second dimensions of the item based on the second image;

compare the second dimensions of the item computed based on the second image with the first dimensions of the item computed based on the first image; and in response to determining that the second dimensions based on the second image are within a predetermined threshold of the first dimensions of the item based on the first image, determine that the second dimensions are acceptable for computing dimensions of the item; and in response to determining that the second dimensions are not within a predefined threshold of the first dimensions of the item based on the first image, display the second image and second dimensions with a sign that indicates the second dimensions of the item are inaccurate.

16. The dimensioning device of claim 15, wherein the processor is configured to compare one or more surface features of the item in the second image with one or more surface features of the item in the first image.

17. A non-transitory computer readable storage medium comprising instructions, which when read and executed by a computer processor are operable for performing, controlling or causing a process, the process comprising:

capturing, by a camera, a first image of an item at a first time from a first perspective associated with a first position of the item, the first image comprising a view of at least two or more surfaces of the item;

computing first dimensions of the item based on the first image;

storing the first dimensions;

capturing, by the camera, a second image of the item at a second time from a second perspective associated with a second position of the item, wherein the first perspective and second perspective are different, and the second image comprises a view of at least one of the two or more surfaces;

computing second dimensions of the item based on the second image;

comparing the second dimensions of the item computed based on the second image with the first dimensions of the item computed based on the first image; and in response to determining that the second dimensions are within a predefined threshold of the first dimensions of the item based on the first image, determining that the second dimensions are acceptable for computing dimensions of the item; and in response to determining that the second dimensions are not within a predefined threshold of the first dimensions of the item based on the first captured image, displaying the second dimensions and the second image with a sign that indicates the second dimensions of the item are inaccurate.

18. The method of claim 1, wherein the comparing step comprises computing a duration of interval between the second time and first time.

19. The dimensioning device of claim 15, wherein the processor is further configured to determine if the item in first image is the same as the item in the second image.

20. The dimensioning device of claim 15, wherein the second position of the item in the second image is displaced relative to the first position of the item in the first image.

* * * * *